US012055887B2

(12) United States Patent
Fujii et al.

(10) Patent No.: US 12,055,887 B2
(45) Date of Patent: Aug. 6, 2024

(54) IMAGE FORMING APPARATUS

(71) Applicant: BROTHER KOGYO KABUSHIKI KAISHA, Nagoya (JP)

(72) Inventors: Yasumasa Fujii, Anjo (JP); Shougo Sato, Seto (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/327,204

(22) Filed: Jun. 1, 2023

(65) Prior Publication Data

US 2023/0315007 A1 Oct. 5, 2023

Related U.S. Application Data

(63) Continuation of application No. 17/932,384, filed on Sep. 15, 2022, now Pat. No. 11,709,456, which is a (Continued)

(30) Foreign Application Priority Data

Sep. 13, 2018 (JP) ................................ 2018-171840

(51) Int. Cl.
*G03G 15/00* (2006.01)
*G03G 15/08* (2006.01)
(Continued)

(52) U.S. Cl.
CPC ..... *G03G 21/1842* (2013.01); *G03G 15/0867* (2013.01); *G03G 21/1619* (2013.01); *G03G 21/1647* (2013.01); *G03G 21/1676* (2013.01)

(58) Field of Classification Search
CPC .......... G03G 15/0867; G03G 21/1619; G03G 21/1647; G03G 21/1676; G03G 21/1842
(Continued)

(56) References Cited

U.S. PATENT DOCUMENTS 8,254,823 B2 8/2012 Nagashima et al.
8,913,919 B2 12/2014 Sato
(Continued)

FOREIGN PATENT DOCUMENTS

JP 4-95980 A 3/1992
JP 2006-350379 A 12/2006
(Continued)

OTHER PUBLICATIONS

Notice of Reasons for Refusal issued in corresponding Japanese Patent Application No. 2018-171840, mailed Jul. 12, 2022.

*Primary Examiner* — Hoan H Tran

(74) *Attorney, Agent, or Firm* — Merchant & Gould P.C.

(57) ABSTRACT

An image forming apparatus includes a main body housing, a drawer, and a toner cartridge. The main body housing includes a first wall arranged at a first direction side of the main body housing and having a first opening, a second wall arranged at a second direction side perpendicular to the first direction and having a second opening, a first door at the first opening, and a second door at the second opening. The drawer supports a drum cartridge having a photosensitive drum. When the first door is opened, the drawer is movable between an inner position where the drawer is located inside the main body housing and an outer position where the drawer is located outside the main body housing. When the second door is opened, the toner cartridge is detachable from and is attachable to the main body housing through the second opening in the second direction.

9 Claims, 19 Drawing Sheets

Related U.S. Application Data continuation of application No. 17/114,581, filed on Dec. 8, 2020, now Pat. No. 11,460,804, which is a continuation of application No. 16/562,087, filed on Sep. 5, 2019, now Pat. No. 10,871,744.

(51) Int. Cl.
*G03G 21/16* (2006.01)
*G03G 21/18* (2006.01)

(58) Field of Classification Search
USPC .......................................................... 399/107
See application file for complete search history.

(56) References Cited

U.S. PATENT DOCUMENTS

| | | | | |
|---|---|---|---|---|
| 9,057,984 | B2 | 6/2015 | Yoshida et al. | |
| 9,201,382 | B2 | 12/2015 | Sato et al. | |
| 9,229,367 | B2 | 1/2016 | Leemhuis et al. | |
| 9,239,563 | B2 | 1/2016 | Sato et al. | |
| 9,507,313 | B2 | 11/2016 | Terai et al. | |
| 10,061,230 | B2 | 8/2018 | Sato | |
| 2004/0101328 | A1 | 5/2004 | Kimura et al. | |
| 2008/0025758 | A1 | 1/2008 | Sato | |
| 2009/0274483 | A1 | 11/2009 | Kim | |
| 2010/0080615 | A1 * | 4/2010 | Kikuchi | G03G 21/1647 399/119 |
| 2012/0219328 | A1 | 8/2012 | Oda et al. | |
| 2013/0028632 | A1 | 1/2013 | Sato et al. | |
| 2014/0147158 | A1 * | 5/2014 | Fujinaka | G03G 21/1661 399/167 |
| 2016/0291537 | A1 | 10/2016 | Sato | |
| 2021/0302910 | A1 * | 9/2021 | Fukusada | G03G 21/1889 |

FOREIGN PATENT DOCUMENTS

| | | | |
|---|---|---|---|
| JP | 2009-86417 | A | 4/2009 |
| JP | 4983130 | B2 | 7/2012 |
| JP | 2013-29755 | A | 2/2013 |
| JP | 2013-167685 | A | 8/2013 |
| JP | 2013-167745 | A | 8/2013 |
| JP | 2013-228682 | A | 11/2013 |
| JP | 2014-106392 | A | 6/2014 |
| JP | 5583157 | B2 | 9/2014 |
| JP | 2016-191732 | A | 11/2016 |

* cited by examiner

IMAGE FORMING APPARATUS

REFERENCE TO RELATED APPLICATIONS

This application is a continuation of U.S. patent application Ser. No. 17/932,384, filed Sep. 15, 2022, which is a continuation of U.S. patent application Ser. No. 17/114,581, filed Dec. 8, 2020, which is a continuation of U.S. patent application Ser. No. 16/562,087, filed Sep. 5, 2019, now U.S. Pat. No. 10,871,744, which claims priority from Japanese Patent Application No. 2018-171840 filed on Sep. 13, 2018. The entire subject-matter of the aforementioned is incorporated herein by reference.

BACKGROUND ART

Technical Field

The present disclosure relates to an image forming apparatus.

Background

An image forming apparatus including a main body housing, a toner cartridge, a drawer, a developing device, and a toner conveyor has been known. The toner cartridge accommodates toner which is to be supplied to the developing device. The drawer supports the toner cartridge. The drawer is movable between an inner position and an outer position. When the drawer is located at the inner position, the drawer is located inside the main body housing. When the drawer is located at the outer position, the drawer is located outside the main body housing. The toner conveyor can convey the toner from the toner cartridge to the developing device (refer to JP-A-2013-228682).

DESCRIPTION

Summary

In the image forming apparatus explained above, the main body housing is provided with the toner conveyor, and the toner conveyor is directly connected to the developing device accommodated in the drawer. For this reason, a structure of a part for interconnecting the toner conveyor and the developing device is complex and a structure in the main body housing is complicated.

An object of the present disclosure is to provide an image forming apparatus capable of suppressing a structure in a main body housing from being complicated.

An image forming apparatus according to the present disclosure includes: a main body housing having: a first wall arranged at a side of a first direction of the main body housing, the first wall having a first opening; a second wall arranged at a side of a second direction of the main body housing, the second wall having a second opening, the second direction being perpendicular to the first direction; a first door at the first opening; and a second door at the second opening; a drawer configured to support a drum cartridge comprising a photosensitive drum; and a toner cartridge storing toner; in which in a case where the first door is opened, the drawer is movable between an inner position where the drawer is located inside the main body housing and an outer position where the drawer is located outside the main body housing, and in which in a case where the second door is opened, the toner cartridge is detachable from and is attachable to the main body housing through the second opening in the second direction.

According to the above configuration, the drawer is provided with the toner conveyor, so that it is possible to simplify a structure of a part provided to the main body housing within a toner conveying path from the toner cartridge to the developing device.

Thereby, it is possible to suppress the structure in the main body housing from being complicated.

According to the image forming apparatus of the present disclosure, it is possible to suppress the structure in the main body housing from being complicated.

DETAILED DESCRIPTION

1. Outline of Image Forming Apparatus

An outline of an image forming apparatus 1 is described with reference to FIGS. 1 to 4.

Figure 1:
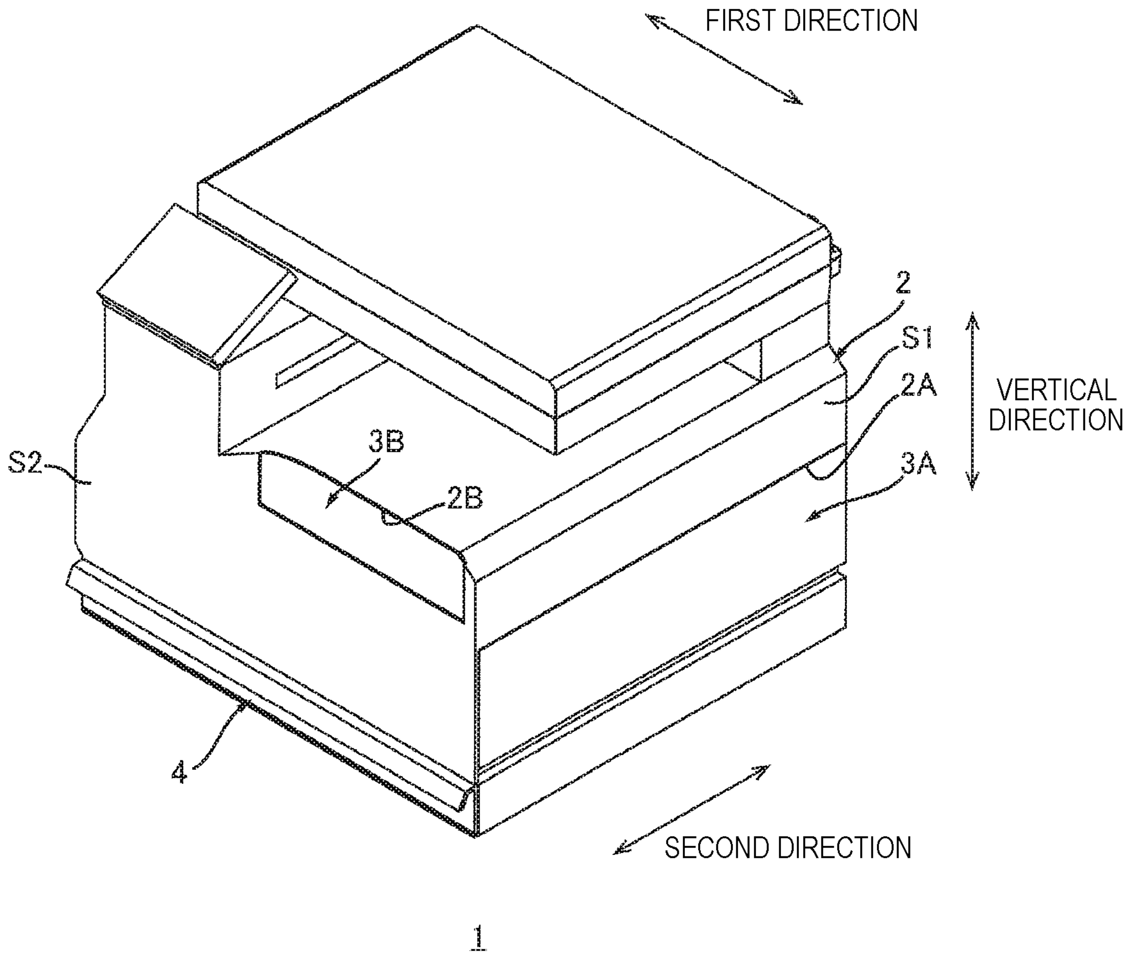
FIG. 1 is a view depicting an outer appearance of an image forming apparatus.
Figure 2:
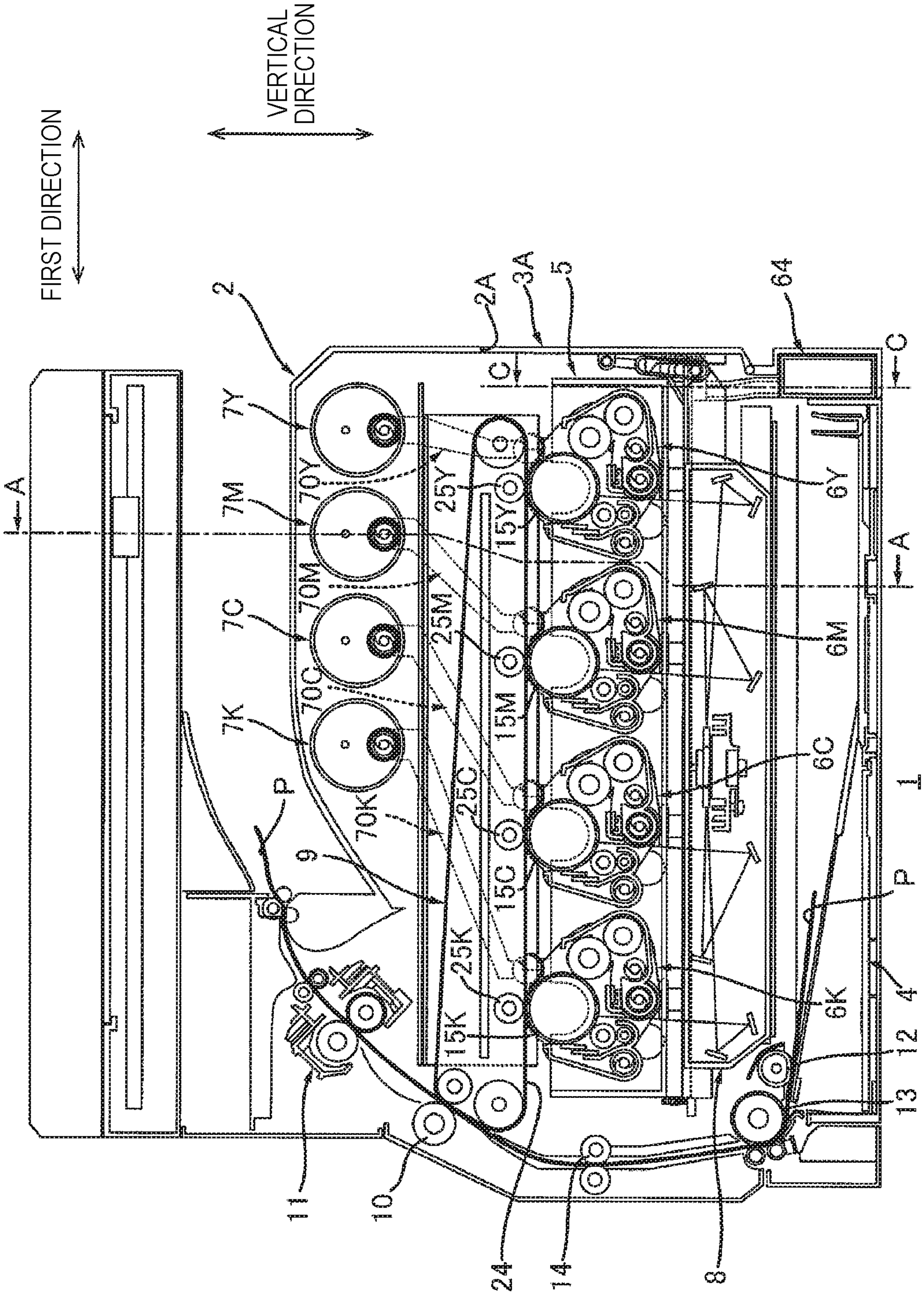
FIG. 2 is a view illustrating an outline of the image forming apparatus shown in FIG. 1.

As shown in FIG. 1 or 2, the image forming apparatus 1 includes a main body housing 2, a cover 3A, a second cover 3B, a feeder cassette 4, a drawer 5, four drum cartridges 6Y, 6M, 6C, 6K, four toner cartridges 7Y, 7M, 7C, 7K, an exposure device 8, an intermediate transfer device 9, a secondary transfer roller 10, and a fixing device 11.

1.1 Main Body Housing and Cover

As shown in FIG. 2, the main body housing 2 accommodates the feeder cassette 4, the drawer 5, the four drum cartridges 6Y, 6M, 6C, 6K, the four toner cartridges 7Y, 7M, 7C, 7K, the exposure device 8, the intermediate transfer device 9, the secondary transfer roller 10 and the fixing device 11.

As shown in FIG. 1, the main body housing 2 has an opening 2A and a second opening 2B. The opening 2A is located on one outer surface 51 of the main body housing 2 in a first direction. The second opening 2B is located on one outer surface S2 of the main body housing 2 in a second direction.

In the meantime, the first direction is a moving direction of the drawer 5. The second direction is a direction in which an axis A1 of a photosensitive drum 15Y extends. The drawer 5 and the photosensitive drum 15Y will be described later. The second direction intersects with the first direction. Preferably, the second direction is perpendicular to the first direction.

The cover 3A is movable between an opening position (refer to FIG. 3) and a closing position (refer to FIG. 2). When the cover 3A is located at the opening position, the opening 2A is opened. When the cover 3A is located at the closing position, the cover 3A closes the opening 2A.

Figure 10:
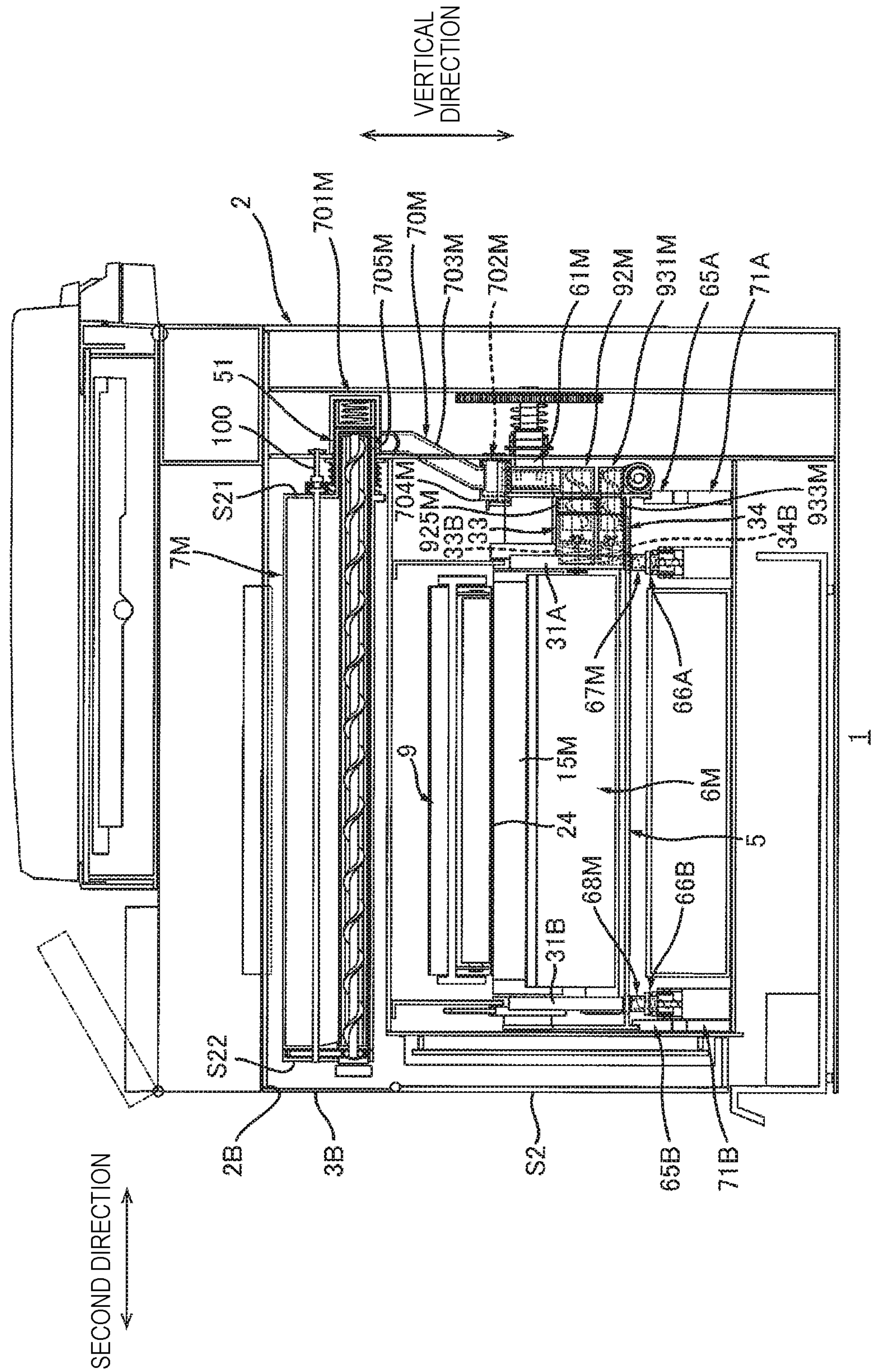
FIG. 10 is a sectional view of the image forming apparatus taken along a line A-A of FIG. 2.

The second cover 3B is movable between an opening position (refer to FIG. 15) and a closing position (refer to FIG. 10). When the second cover 3B is located at the opening position, the second opening 2B is opened. When the second cover 3B is located at the closing position, the second cover 3B closes the second opening 2B.

1.2 Feeder Cassette

As shown in FIG. 2, the feeder cassette 4 enables to accommodate a printing sheet P. The printing sheet P in the feeder cassette 4 is conveyed toward the secondary transfer roller 10 by a pickup roller 12, a feeder roller 13 and conveyor rollers 14.

1.3 Drawer

Figure 3:
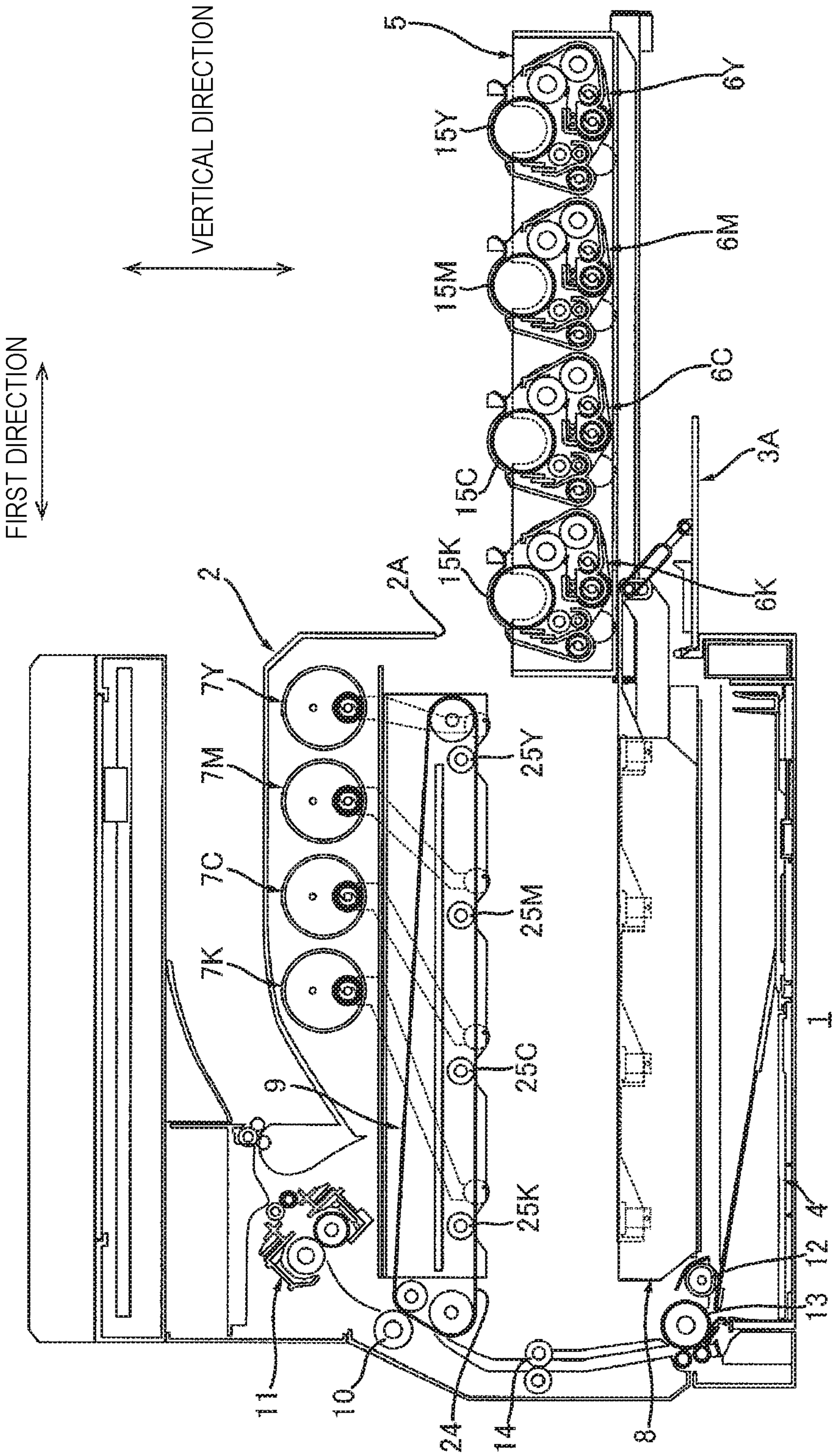
FIG. 3 is a view depicting a state where a drawer shown in FIG. 2 is located at an outer position.

As shown in FIGS. 2 and 3, the drawer 5 is movable in the first direction between an inner position (refer to FIG. 2) and an outer position (refer to FIG. 3) through the opening 2A when the cover 3A is located at the opening position. When the drawer 5 is located at the inner position, the drawer 5 is located inside the main body housing 2. When the drawer 5 is located at the inner position, the drawer 5 is located above the feeder cassette 4. When the drawer 5 is located at the outer position, the drawer 5 is located outside the main body housing 2.

1.4 Drum Cartridge

As shown in FIG. 2, each of the four drum cartridges 6Y, 6M, 6C, 6K is supported by the drawer 5. When the four drum cartridges 6Y, 6M, 6C, 6K are attached to the drawer 5, they are aligned side by side in the first direction. That is, the drum cartridge 6Y is arranged in alignment with the drum cartridge 6M in the first direction when the drum cartridge 6Y and the drum cartridge 6M are attached to the drawer 5. Each of the four drum cartridges 6Y, 6M, 6C, 6K is attachable to and detachable from the drawer 5 along the second direction when the drawer 5 is located at the outer position (refer to FIG. 3).

Figure 4:
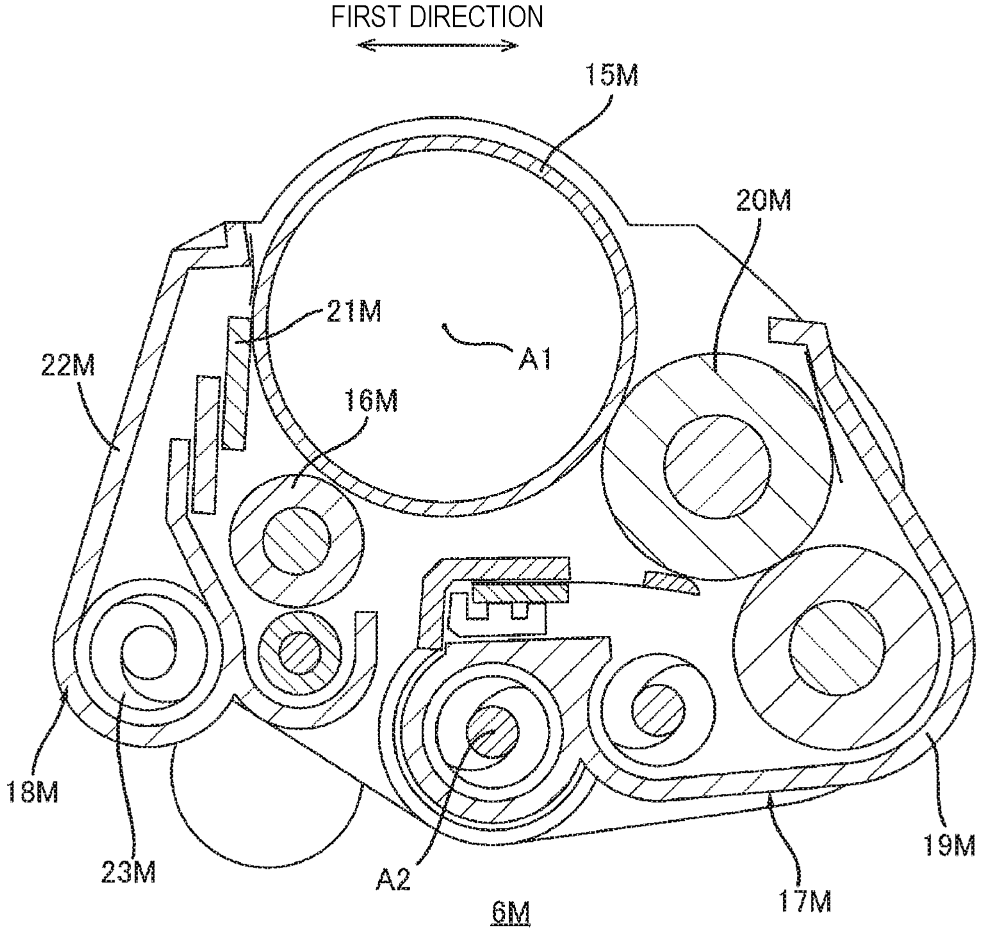
FIG. 4 is an enlarged view of a drum cartridge shown in FIG. 2.

As shown in FIG. 4, the drum cartridge 6M includes a photosensitive drum 15M, a charging roller 16M, a developing device 17M, and a drum cleaner 18M.

The photosensitive drum 15M is rotatable about the axis A1 extending in the second direction. The photosensitive drum 15M extends in the second direction. The photosensitive drum 15M has a cylindrical shape.

The charging roller 16M charges a peripheral surface of the photosensitive drum 15M. In the meantime, the drum cartridge 6M may include a scorotron-type charger, instead of the charging roller 16M.

The developing device 17M supplies toner to the peripheral surface of the photosensitive drum 15M. The developing device 17M is swingable about a swing axis A2 extending in the second direction. The developing device 17M includes a developing housing 19M and a developing roller 20M.

The developing housing 19M accommodates toner.

The developing roller 20M is supported by the developing housing 19M. The developing roller 20M is rotatable about an axis extending in the second direction. The developing roller 20M is in contact with the photosensitive drum 15M. Thereby, the developing roller 20M enables to supply the toner in the developing housing 19M to a surface of the photosensitive drum 15M.

The drum cleaner 18M cleans the peripheral surface of the photosensitive drum 15M. The drum cleaner 18M includes a cleaning blade 21M, a cleaner housing 22M, and an auger screw 23M.

The cleaning blade 21M has a flat plate shape. The cleaning blade 21M extends in the second direction. An edge of the cleaning blade 21M is in contact with the peripheral surface of the photosensitive drum 15M. The cleaning blade 21M scrapes the toner remaining on the peripheral surface of the photosensitive drum 15M from the peripheral surface of the photosensitive drum 15M when the photosensitive drum 15M is rotated. Thereby, the peripheral surface of the photosensitive drum 15M is cleaned. The toner scraped from the peripheral surface of the photosensitive drum 15M by the cleaning blade 21M is defined as 'waste toner'.

The cleaner housing 22M supports the cleaning blade 21M. The cleaner housing 22M accommodates the waste toner.

The auger screw 23M is located inside the cleaner housing 22M. The auger screw 23M is conveys the waste toner in the cleaner housing 22M in the second direction.

In the meantime, as shown in FIG. 2, the drum cartridges 6Y, 6C, 6K have the same structure as the drum cartridge 6M.

1.5 Toner Cartridge

As shown in FIG. 2, the four toner cartridges 7Y, 7M, 7C, 7K are attachable to and detachable from the image forming apparatus 1 along the second direction through the second opening 2B (refer to FIG. 1) when the cover 3B (refer to FIG. 1) is located at the opening position. The toner cartridge 7Y accommodates the toner which is to be supplied to the developing device 17Y of the drum cartridge 6Y. The toner cartridge 7M accommodates the toner which is to be supplied to the developing device 17M of the drum cartridge 6M. The toner cartridge 7C accommodates the toner which is to be supplied to the developing device 17C of the drum cartridge 6C. The toner cartridge 7K accommodates the toner which is to be supplied to the developing device 17K of the drum cartridge 6K.

1.6 Intermediate Transfer Device

The intermediate transfer device 9 is located above the four drum cartridges 6Y, 6M, 6C, 6K when the four drum cartridges 6Y, 6M, 6C, 6K are attached to the drawer 5 and the drawer 5 is located at the inner position. The intermediate transfer device 9 includes an intermediate transfer belt 24 and four primary transfer rollers 25Y, 25M, 25C, 25K.

The intermediate transfer belt 24 is in contact with the four photosensitive drums 15Y, 15M, 15C, 15K when the four drum cartridges 6Y, 6M, 6C, 6K are attached to the drawer 5 and the drawer 5 is located at the inner position.

The primary transfer roller 25Y transfers a toner image on the photosensitive drum 15Y to the intermediate transfer belt 24. The primary transfer roller 25M transfers a toner image on the photosensitive drum 15M to the intermediate transfer belt 24. The primary transfer roller 25C transfers a toner image on the photosensitive drum 15C to the intermediate transfer belt 24. The primary transfer roller 25K transfers a toner image on the photosensitive drum 15K to the intermediate transfer belt 24.

1.7 Secondary Transfer Roller

The secondary transfer roller 10 transfers the toner images transferred to the intermediate transfer belt 24 to the printing sheet P. The printing sheet P fed from the feeder cassette 4 passes between the secondary transfer roller 10 and the intermediate transfer belt 24 and is then conveyed to the fixing device 11. At this time, the secondary transfer roller 10 transfers the toner images on the intermediate transfer belt 24 to the printing sheet P.

1.8 Fixing Device

The fixing device 11 heats and presses the printing sheet P having the toner images transferred thereon to fix the toner images on the printing sheet P. The printing sheet P having passed through the fixing device 11 is discharged on an upper surface of the main body housing 2.

2. Details of Toner Cartridge

The toner cartridge 7M is described in detail with reference to FIGS. 5A and 5B. In the meantime, the toner cartridges 7Y, 7C, 7K have the same structure as the toner cartridge 7M, respectively. Therefore, in the below, the descriptions of the toner cartridges 7Y, 7C, 7K are omitted.

Figure 5A:
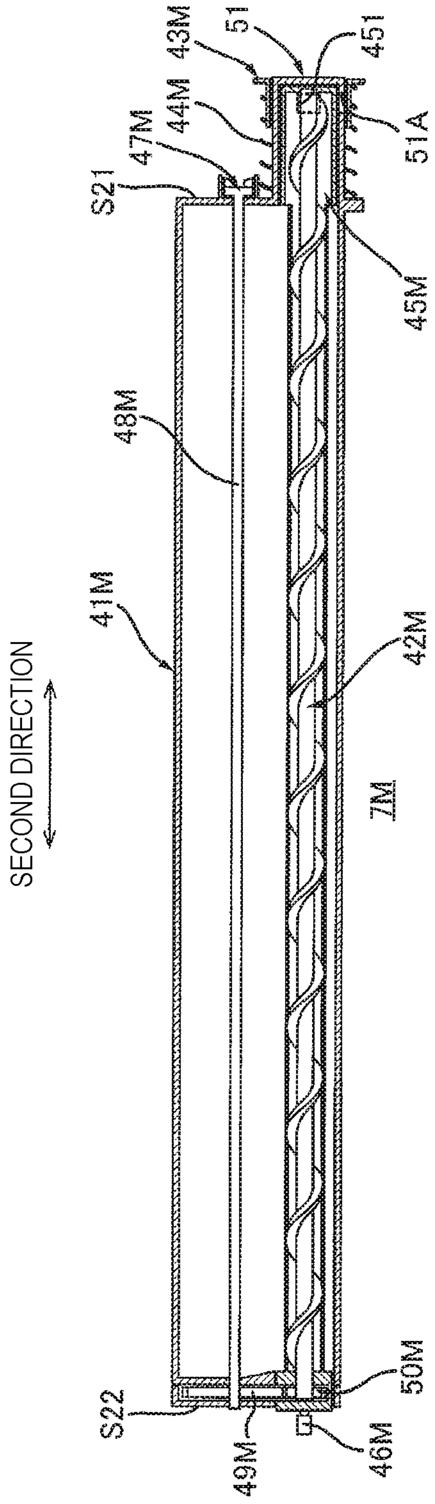
FIG. 5A is a sectional view of a toner cartridge, depicting a state where a first shutter is located at a closing position and a second shutter is located at a closing position.
Figure 5B:
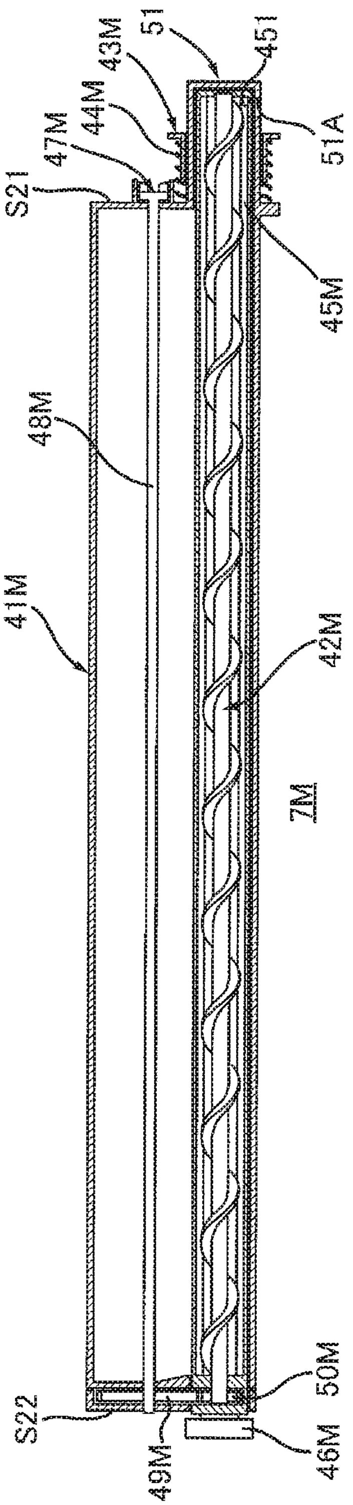
FIG. 5B depicts a state where the first shutter of the toner cartridge shown in FIG. 5A is located at the opening position and the second shutter is located at the opening position.

As shown in FIG. 5A, the toner cartridge 7M extends in the second direction. The toner cartridge 7M includes a housing 41M, an auger screw 42M, a first shutter 43M, a spring 44M, a second shutter 45M, a projection 46M, a coupling 47M, a shaft 48M, and two gears 49M, 50M.

2.1 Housing

The housing 41M extends in the second direction. The housing 41M has a cylindrical shape. The housing 41M accommodates the toner. The housing 41M has one outer surface S21 in the second direction and the other outer surface S22 in the second direction. The outer surface S22 is located distant from the outer surface S21 in the second direction. The outer surface S22 is located the second cover 3B (refer to FIG. 10) and the outer surface S21 in the second direction when the toner cartridge 7M is attached to the image forming apparatus 1. Also, the housing 41M has a protrusion 51.

The protrusion 51 is located on the outer surface S21 of the housing 41M. The protrusion 51 extends from the outer surface S21. The protrusion 51 extends in the second direction. The protrusion 51 has a cylindrical shape. An internal space of the protrusion 51 connects with an internal space of the housing 41M. The protrusion 51 has a toner discharge opening 51A. The toner discharge opening 51A is located on a peripheral surface of the protrusion 51. The toner discharge opening 51A connects with the internal space of the protrusion 51. Thereby, the toner is discharged through the toner discharge opening 51A.

2.2 Auger Screw

The auger screw 42M is located inside the housing 41M. The auger screw 42M extends in the second direction. The auger screw 42M is rotatable about an axis extending in the second direction. The auger screw 42M conveys the toner in the housing 41M toward the toner discharge opening 51A.

2.3 First Shutter and Spring

The first shutter 43M is located on the outer surface S21 of the housing 41M. Specifically, the first shutter 43M is located on an outer peripheral surface of the protrusion 51. The first shutter 43M is movable in the second direction between a closing position (refer to FIG. 5A) and an opening position (refer to FIG. 5B). When the first shutter 43M is located at the closing position, the first shutter 43M closes the toner discharge opening 51A. When the first shutter 43M is located at the opening position, the toner discharge opening 51A is opened.

The spring 44M is provided to press the first shutter 43M located at the opening position toward the closing position. When the toner cartridge 7M is attached to the image forming apparatus 1, the first shutter 43M comes in contact with a part of the image forming apparatus 1, thereby moving from the closing position to the opening position against a pressing force of the spring 44M. On the other hand, when the toner cartridge 7M is detached from the image forming apparatus 1, the first shutter 43M is moved from the opening position to the closing position by the pressing force of the spring 44M.

2.4 Second Shutter and Projection

The second shutter 45M is located inside the housing 41M. Specifically, the second shutter 45M is located in the protrusion 51. The second shutter 45M is movable between the closing position (refer to FIG. 5A) and the opening position (refer to FIG. 5B). When the second shutter 45M is located at the closing position, the second shutter 45M closes the toner discharge opening 51A. When the second shutter 45M is located at the opening position, the toner discharge opening 51A is opened. Specifically, as shown in FIG. 5B, the second shutter 45M extends from the outer surface S22 of the housing 41M to the protrusion 51 in the second direction. The second shutter 45M is rotatable about an axis extending in the second direction between the closing position and the opening position. The second shutter 45M has an opening 451. The opening 451 connects with the toner discharge opening 51A when the second shutter 45M is located at the opening position. On the other hand, the opening 451 is located distant from the toner discharge opening 51A and does not connect with the toner discharge opening 51A, when the second shutter 45M is located at the closing position.

The projection 46M is located on the outer surface S22 of the housing 41M. The projection 46M is rotatable about an axis extending in the second direction, together with the second shutter 45M. A user can move the second shutter 45M between the opening position and the closing position by turning the projection 46M.

2.5 Coupling, Shaft and Two Gears

The coupling 47M is located on the outer surface S21 of the housing 41M. The coupling 47M is rotatable about an axis extending in the second direction. The coupling 47M is connected to a coupling 100 (refer to FIGS. 10 and 15) in the main body housing 2 when the toner cartridge 7M is attached to the image forming apparatus 1. The coupling 47M is rotatable together with the coupling 100 when the coupling 47M is connected to the coupling 100. Thereby, the coupling 47M enables to receive the power from the coupling 100 when the toner cartridge 7M is attached to the image forming apparatus 1.

The shaft 48M extends in the second direction. The shaft 48M is rotatable about an axis extending in the second direction together with the coupling 47M. Specifically, the shaft 48M has a first end that is to be connected to the coupling 47M and a second end that is located distant from the first end in the second direction.

The gear 49M is mounted to the second end of the shaft 48M. The gear 49M is rotatable together with the shaft 48M.

The gear 50M is mounted to the auger screw 42M. The gear 50M is rotatable together with the auger screw 42M. The gear 50M is in mesh with the gear 49M. The power received from the coupling 100 by the coupling 47M is transmitted to the auger screw 42M by the shaft 48M, the gear 49M and the gear 50M.

3. Details of Drum Cartridge

The drum cartridge 6M is described in detail with reference to FIGS. 6 to 7B. In the meantime, the drum cartridges 6Y, 6C, 6K have the same structure as the drum cartridge 6M, respectively. Therefore, in the below, the descriptions of the drum cartridges 6Y, 6C, 6K are omitted.

Figure 6:
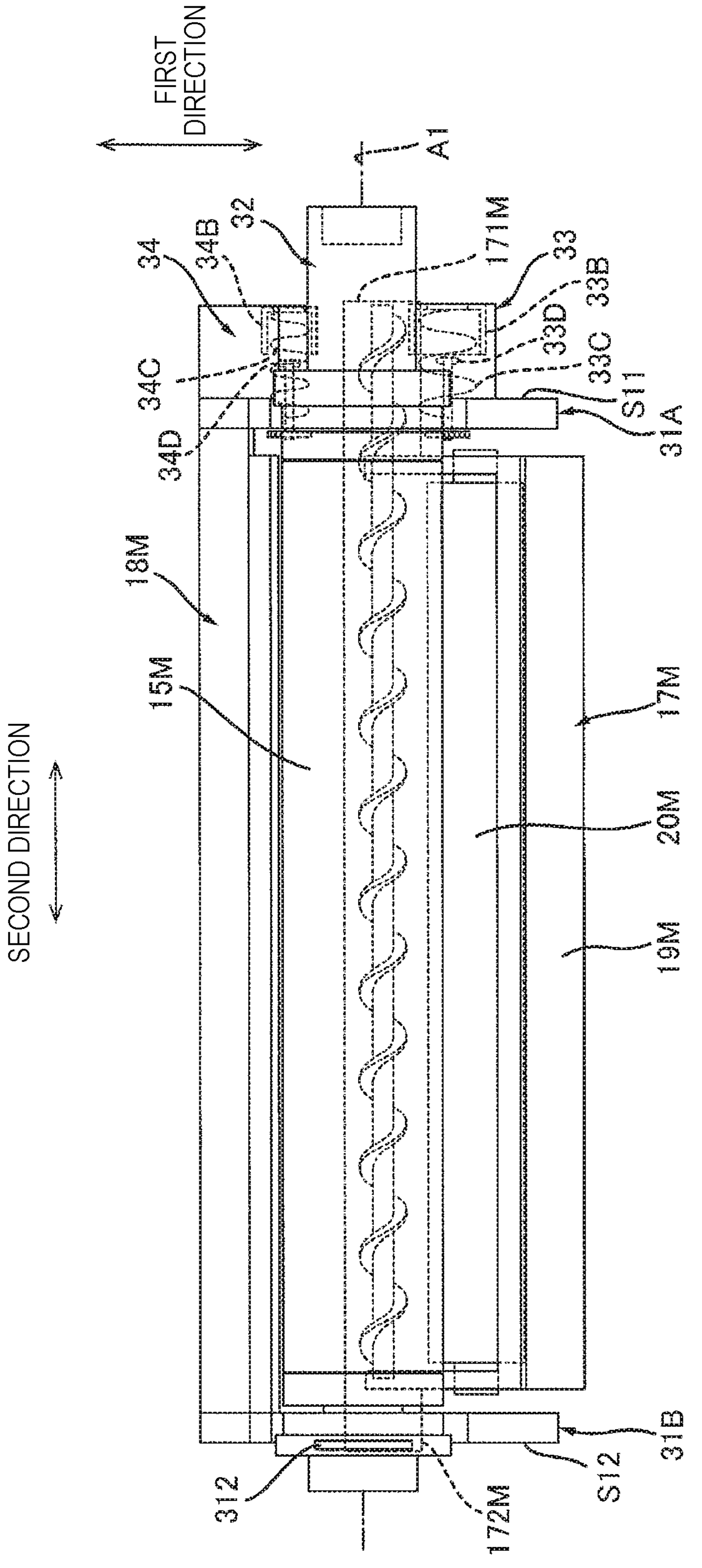
FIG. 6 is a plan view of the drum cartridge shown in FIG. 4.

As shown in FIG. 6, the drum cartridge 6M includes two drum side plates 31A, 31B, a drum coupling 32, a first connection part 33, and a second connection part 34, in addition to the photosensitive drum 15M, the charging roller 16M (refer to FIG. 4), the developing device 17M and the drum cleaner 18M.

3.1 Drum Side Plate

Figure 7A:
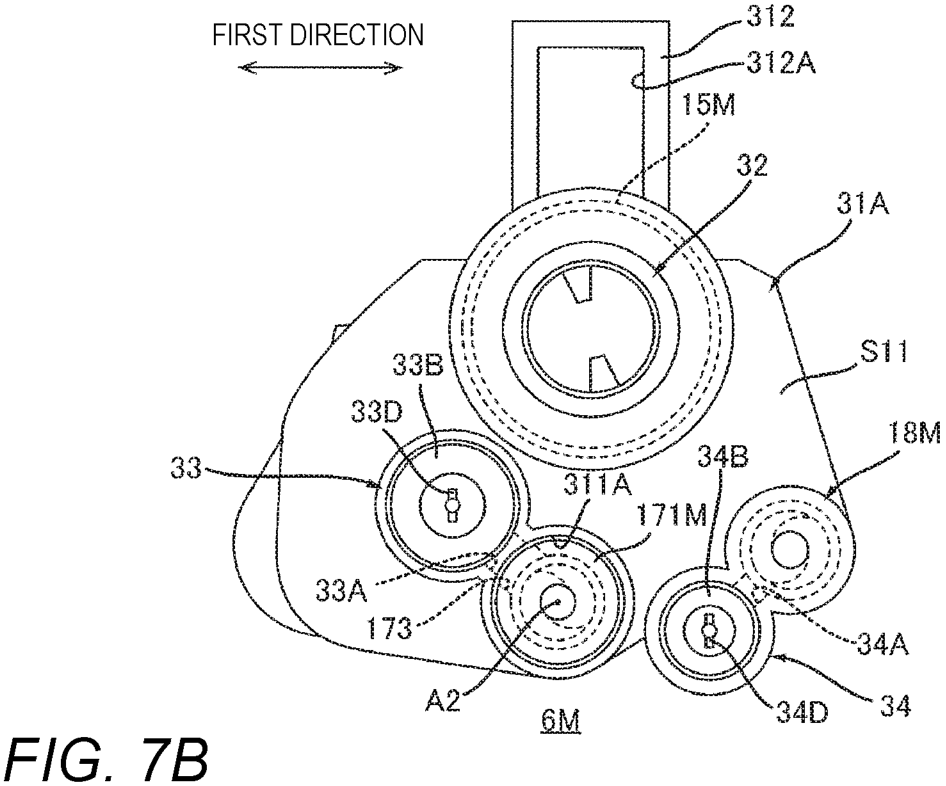
FIG. 7A is a side view of the drum cartridge shown in FIG. 6, as seen from one side in the second direction.

As shown in FIGS. 6 and 7A, the drum side plate 31A is located at one end portion of the drum cartridge 6M in the second direction. The drum side plate 31A has one outer surface S11 of the drum cartridge 6M in the second direction. The drum side plate 31A supports one end portion of the photosensitive drum 15M in the second direction. Also, the drum side plate 31A supports one end portion of the developing device 17M in the second direction. Specifically, the developing device 17M has a protrusion 171M (refer to FIGS. 6 and 7A) and a protrusion 172M (refer to FIGS. 6 and 7B). The protrusion 171M extends from one end portion of the developing housing 19M in the second direction. The protrusion 171M extends along the swing axis A2. The protrusion 171M has a cylindrical shape. The protrusion 172M is located at an opposite side to the protrusion 171M with respect to the developing housing 19M in the second direction. The protrusion 172M extends from the other end portion of the developing housing 19M in the second direction. The protrusion 172M extends along the swing axis A2. The protrusion 172M has a cylindrical shape. The drum side plate 31A has a through-hole 311A, as shown in FIG. 7A. The through-hole 311A has a circular shape. The protrusion 171M is fitted in the through-hole 311A. The protrusion 171M is rotatable with respect to the drum side plate 31A.

Figure 7B:
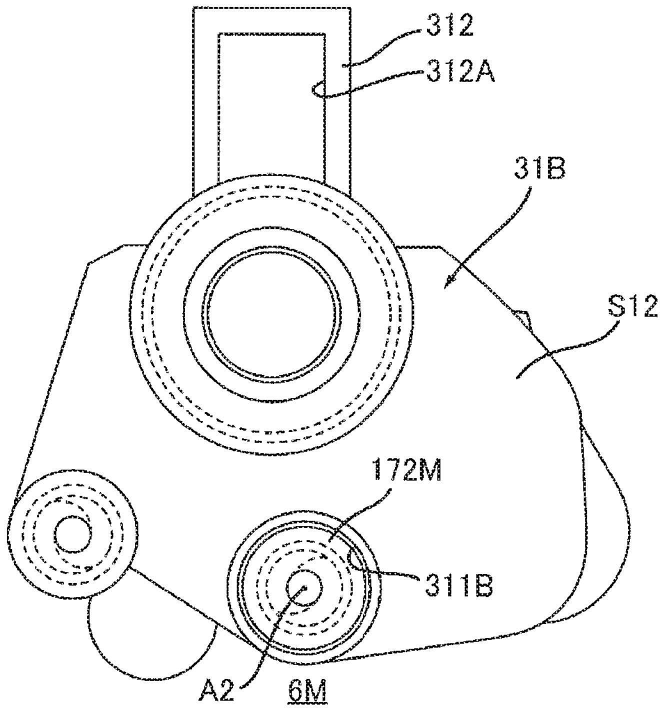
FIG. 7B is a side view of the drum cartridge shown in FIG. 6, as seen from the other side in the second direction.

As shown in FIGS. 6 and 7B, the drum side plate 31B is located at the other end portion of the drum cartridge 6M in the second direction. The drum side plate 31B is located distant from the drum side plate 31A in the second direction. The drum side plate 31B has the other outer surface S12 of the drum cartridge 6M in the second direction. The outer surface S12 is located distant from the outer surface S11 in the second direction. The drum side plate 31B supports the other end portion of the photosensitive drum 15M in the second direction. Also, the drum side plate 31B supports the other end portion of the developing device 17M in the second direction. The drum side plate 31B has a through-hole 311B, as shown in FIG. 7B. The through-hole 311B has a circular shape. The protrusion 172M is fitted in the through-hole 311B. The protrusion 172M is rotatable with respect to the drum side plate 31B. The protrusion 171M is fitted in the through-hole 311A, the protrusion 172M is fitted in the through-hole 311B, the protrusion 171M is rotatable with respect to the drum side plate 31A and the protrusion 172M is rotatable with respect to the drum side plate 31B, so that the developing device 17M enables to swing with respect to the swing axis A2.

Also, the drum side plate 31B has a knob 312. The knob 312 is located at an upper end portion of the drum side plate 31B. The knob 312 extends from the upper end portion of the drum side plate 31B. The knob 312 extends in the vertical direction, and has a plate shape. The knob 312 has a through-hole 312A. The user can detach the drum cartridge 6M from the drawer 5 with putting a finger on the knob 312.

3.2 Drum Coupling

As shown in FIGS. 6 and 7A, the drum coupling 32 is located on one outer surface S11 of the drum cartridge 6M in the second direction. Specifically, the drum coupling 32 is located at one end portion of the photosensitive drum 15M in the second direction. The drum coupling 32 is supported by the drum side plate 31A. The drum coupling 32 is rotatable together with the photosensitive drum 15M. When the drum cartridge 6M is attached to the drawer 5 and the drawer 5 is located at the inner position, the drum coupling 32 is connected to a main body coupling 61M (refer to FIG. 10). The drum coupling 32 is rotatable together with the main body coupling 61M when the drum coupling 32 is connected to the main body coupling 61M.

3.3 First Connection Part

As shown in FIG. 6, the first connection part 33 is located on one outer surface S11 of the drum cartridge 6M in the second direction. The first connection part 33 extends from the drum side plate 31A. The first connection part 33 extends in the second direction. The first connection part 33 has a cylindrical shape. The first connection part 33 connects with the protrusion 171M of the developing device 17M. Specifically, as shown in FIG. 7A, the first connection part 33 has a through-hole 33A. The through-hole 33A connects with a receiving opening 173 of the protrusion 171M. When the drum cartridge 6M is attached to the drawer 5, the first connection part 33 is connected to a toner conveyor 92M (refer to FIG. 8). The toner conveyor 92M will be described later. The through-hole 33A connects with a toner discharge opening (not shown) of the toner conveyor 92M when the toner conveyor 92M is connected to the first connection part 33. Thereby, the toner in the toner conveyor 92M is entered to the protrusion 171M of the developing device 17M through the toner discharge opening, the through-hole 33A and the receiving opening 173. Also, the first connection part 33 has a shutter 33B, a spring 33C (refer to FIG. 6), and a first output coupling 33D. That is, the drum cartridge 6M includes the first output coupling 33D.

The shutter 33B is located inside the first connection part 33. The shutter 33B is movable in the second direction between a closing position (refer to FIG. 6) at which the through-hole 33A is closed and an opening position (refer to FIG. 10) at which the through-hole 33A is opened.

As shown in FIG. 6, the spring 33C is located inside the first connection part 33. The spring 33C is provided to press the shutter 33B located at the opening position toward the closing position. When the toner conveyor 92M is connected to the first connection part 33, the shutter 33B is pressed by the toner conveyor 92M and is thus moved from the closing position to the opening position, against a pressing force of the spring 33C. Also, when the toner conveyor 92M and the first connection part 33 are disconnected, the shutter 33B is moved from the opening position to the closing position by the pressing force of the spring 33C.

As shown in FIG. 6, the first output coupling 33D is located inside the first connection part 33. The first output coupling 33D is rotatable by the power from the drum coupling 32. The first output coupling 33D transmits the power to the toner conveyor 92M. Specifically, the first output coupling 33D is connected to a first coupling 924M (refer to FIG. 9) of the toner conveyor 92M when the toner conveyor 92M is connected to the first connection part 33. The first output coupling 33D is rotatable together with the first coupling 924M with being connected to the first coupling 924M. Thereby, the first output coupling 33D enables to transmit the power to the first coupling 924M when the toner conveyor 92M is connected to the first connection part 33.

3.4 Second Connection Part

As shown in FIG. 6, the second connection part 34 is located on one outer surface S11 of the drum cartridge 6M in the second direction. The second connection part 34 extends from the drum side plate 31A. The second connection part 34 extends in the second direction. The second connection part 34 has a cylindrical shape. The second connection part 34 connects with the drum cleaner 18M. Specifically, as shown in FIG. 7A, the second connection part 34 has a through-hole 34A. The through-hole 34A connects with an internal space of the drum cleaner 18M. When the drum cartridge 6M is attached to the drawer 5, the second connection part 34 is connected to a first waste toner tube 931M (refer to FIG. 8) of a waste toner conveyor 93. The waste toner conveyor 93 will be described later. The through-hole 34A connects with a waste toner receiving opening (not shown) of the first waste toner tube 931M when the first waste toner tube 931M of the waste toner conveyor 93 is connected to the second connection part 34. Thereby, the waste toner in the drum cleaner 18M is entered to the first waste toner tube 931M through the through-hole 34A and the waste toner receiving opening. Also, the second connection part 34 has a shutter 34B, a spring 34C (refer to FIG. 6), and a second output coupling 34D. That is, the drum cartridge 6M has the second output coupling 34D.

The shutter 34B is located inside the second connection part 34. The shutter 34B is movable in the second direction between a closing position (refer to FIG. 6) at which the through-hole 34A is closed and an opening position (refer to FIG. 10) at which the through-hole 34A is opened.

The spring 34C is located inside the second connection part 34. The spring 34C is provided to press the shutter 34B located at the opening position toward the closing position. When the first waste toner tube 931M is connected to the second connection part 34, the shutter 34B is pressed by the first waste toner tube 931M, and is thus moved from the closing position to the opening position against a pressing force of the spring 34C. Also, when the first waste toner tube 931M and the second connection part 34 are disconnected, the shutter 34B is moved from the opening position to the closing position by the pressing force of the spring 34C.

The second output coupling 34D is located inside the second connection part 34. The second output coupling 34D is rotatable by power from the drum coupling 32. The second output coupling 34D transmits the power to the first waste toner tube 931M. Specifically, the second output coupling 34D is connected to a second coupling 935M (refer to FIG. 9) of the first waste toner tube 931M when the first waste toner tube 931M is connected to the second connection part 34. The second output coupling 34D is rotatable together with the second coupling 935M when it is connected to the second coupling 935M. Thereby, the second output coupling 34D enables to transmit the power to the second coupling 935M when the first waste toner tube 931M is connected to the second connection part 34.

4. Details of Drawer

Subsequently, the drawer 5 is described in detail with reference to FIGS. 8 and 9.

Figure 8:
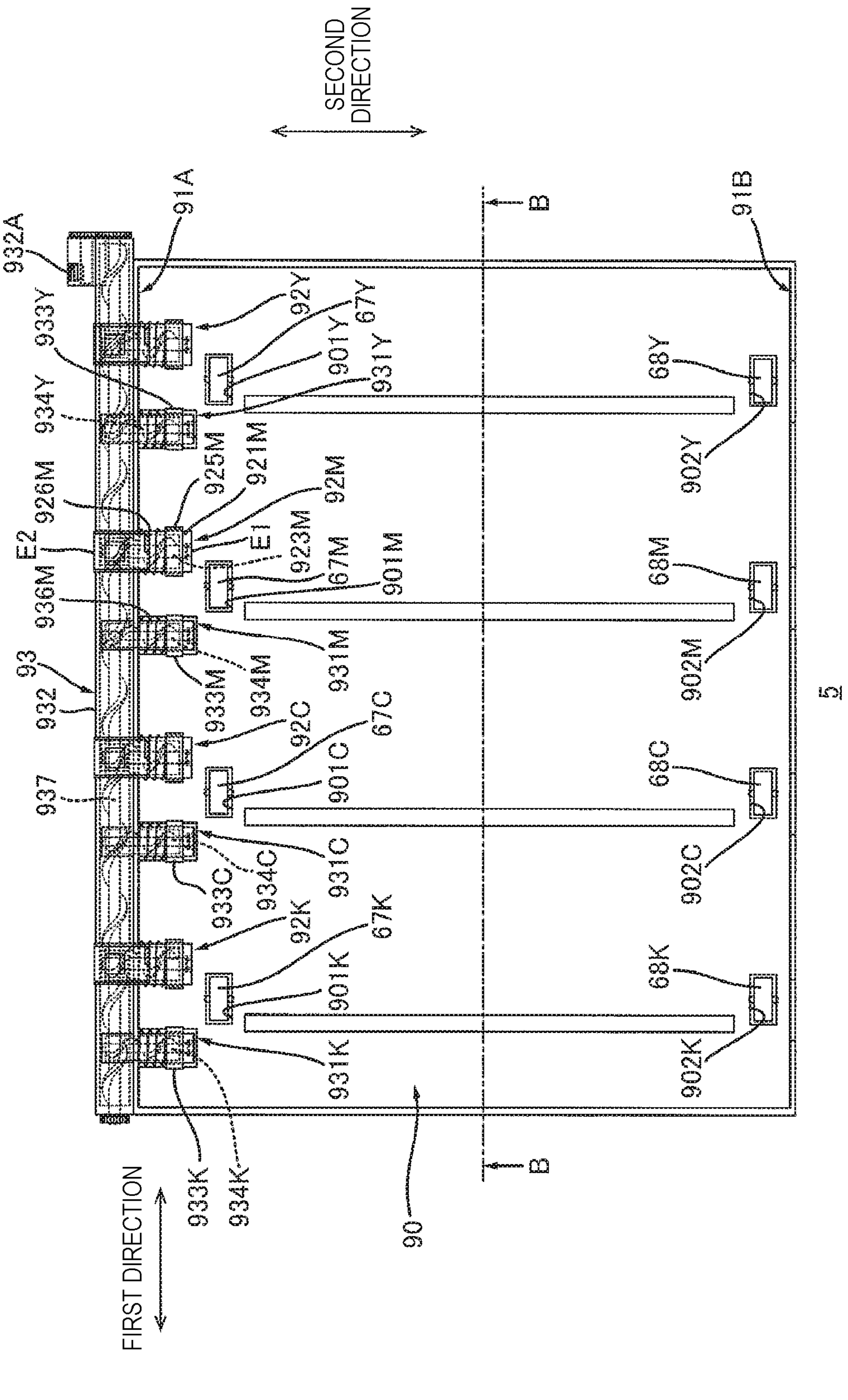
FIG. 8 is a plan view of the drawer.

As shown in FIG. 8, the drawer 5 includes a first sidewall 91A, a second sidewall 91B, a bottom plate 90, four toner conveyors 92Y, 92M, 92C, 92K, and a waste toner conveyor 93.

4.1 First Sidewall and Second Sidewall

As shown in FIG. 8, the first sidewall 91A is located at one end of the drawer 5 in the second direction. The first sidewall 91A extends in the first direction. The first sidewall 91A has a flat plate shape. As shown in FIG. 9, the first sidewall 91A has four notches 94Y, 94M, 94C, 94K.

The four notches 94Y, 94M, 94C, 94K are aligned with intervals in the first direction. When the drum cartridge 6M is supported by the drawer 5, the drum coupling 32 of the drum cartridge 6M is exposed through the notch 94M. In the meantime, when the drum cartridge 6Y is supported by the drawer 5, the drum coupling 32 of the drum cartridge 6Y is exposed through the notch 94Y. When the drum cartridge 6C is supported by the drawer 5, the drum coupling 32 of the drum cartridge 6C is exposed through the notch 94C. When the drum cartridge 6K is supported by the drawer 5, the drum coupling 32 of the drum cartridge 6K is exposed through the notch 94K.

As shown in FIG. 8, the second sidewall 91B is located at the other end of the drawer 5 in the second direction. The second sidewall 91B is located distant from the first sidewall 91A in the second direction. The second sidewall 91B extends in the first direction. The second sidewall 91B has a flat plate shape.

4.2 Bottom Plate

The bottom plate 90 is located between the first sidewall 91A and the second sidewall 91B in the second direction. The bottom plate 90 extends in the first direction and the second direction. One end portion of the bottom plate 90 in the second direction is connected to the first sidewall 91A. The other end portion of the bottom plate 90 in the second direction is connected to the second sidewall 91B. The bottom plate 90 has through-holes 901Y, 901M, 901C, 901K, 902Y, 902M, 902C, 902K.

A pressing member 67M passes through the through-hole 901M. The pressing member 67M will be described later. The through-hole 901M is located between the developing roller 20M and the first sidewall 91A in the second direction when the drum cartridge 6M is attached to the drawer 5.

Also, a pressing member 68M passes through the through-hole 902M. The pressing member 68M will be described later. The through-hole 902M is located between the developing roller 20M and the second sidewall 91B in the second direction when the drum cartridge 6M is attached to the drawer 5.

In the meantime, the through-holes 901Y, 901C, 901K can be described in the same manner as the through-hole 901M, and the through-holes 902Y, 902C, 902K can be described in the same manner as the through-hole 902M. Therefore, the descriptions of the through-holes 901Y, 901C, 901K, 902Y, 902C, 902K are omitted.

4.3 Toner Conveyor

As shown in FIG. 8, the four toner conveyors 92Y, 92M, 92C, 92K are aligned with intervals in the first direction. The four toner conveyors 92Y, 92M, 92C, 92K are provided at the first sidewall 91A. The toner conveyor 92M enables to convey the toner which is to be supplied from the toner cartridge 7M to the drum cartridge 6M. Specifically, the toner conveyor 92M is connected to a connection tube 70M (refer to FIG. 10) and enables to convey the toner from the connection tube 70M to the drum cartridge 6M when the drawer 5 is located at the inner position. The connection tube 70M will be described later. The toner conveyor 92M includes a first toner tube 921M, a second toner tube 922M (refer to FIG. 9), a shutter 925M, a first auger screw 923M, and a first coupling 924M (refer to FIG. 9).

In the meantime, the toner conveyors 92Y, 92C, 92K have the same structure as the toner conveyor 92M, respectively. That is, the toner conveyor 92Y enables to convey the toner which is to be supplied from the toner cartridge 7Y to the drum cartridge 6Y. In the below, the descriptions of the toner conveyors 92Y, 92C, 92K are omitted.

4.3.1 First Toner Tube

As shown in FIG. 8, the first toner tube 921M extends in the second direction. The first toner tube 921M has a cylindrical shape. The first toner tube 921M has one end E1 and the other end E2 in the second direction. The other end E2 is located distant from one end E1 in the second direction. When the drum cartridge 6M is attached to the drawer 5, one end E1 of the first toner tube 921M is connected to the first connection part 33 (refer to FIG. 6) of the drum cartridge 6M. In the meantime, the first toner tube 921M has a toner discharge opening (not shown). The toner discharge opening connects with an internal space of the first toner tube 921M. Thereby, the toner in the first toner tube 921M is discharged through the toner discharge opening. When one end E1 of the first toner tube 921M is connected to the first connection part 33 of the drum cartridge 6M, the toner discharge opening connects with the through-hole 33A (refer to FIG. 7A) of the first connection part 33. Thereby, the toner discharged from the toner discharge opening is entered to the protrusion 171M of the developing housing 19M through the through-hole 33A and the receiving opening 173.

4.3.2 Second Toner Tube

Figure 9:
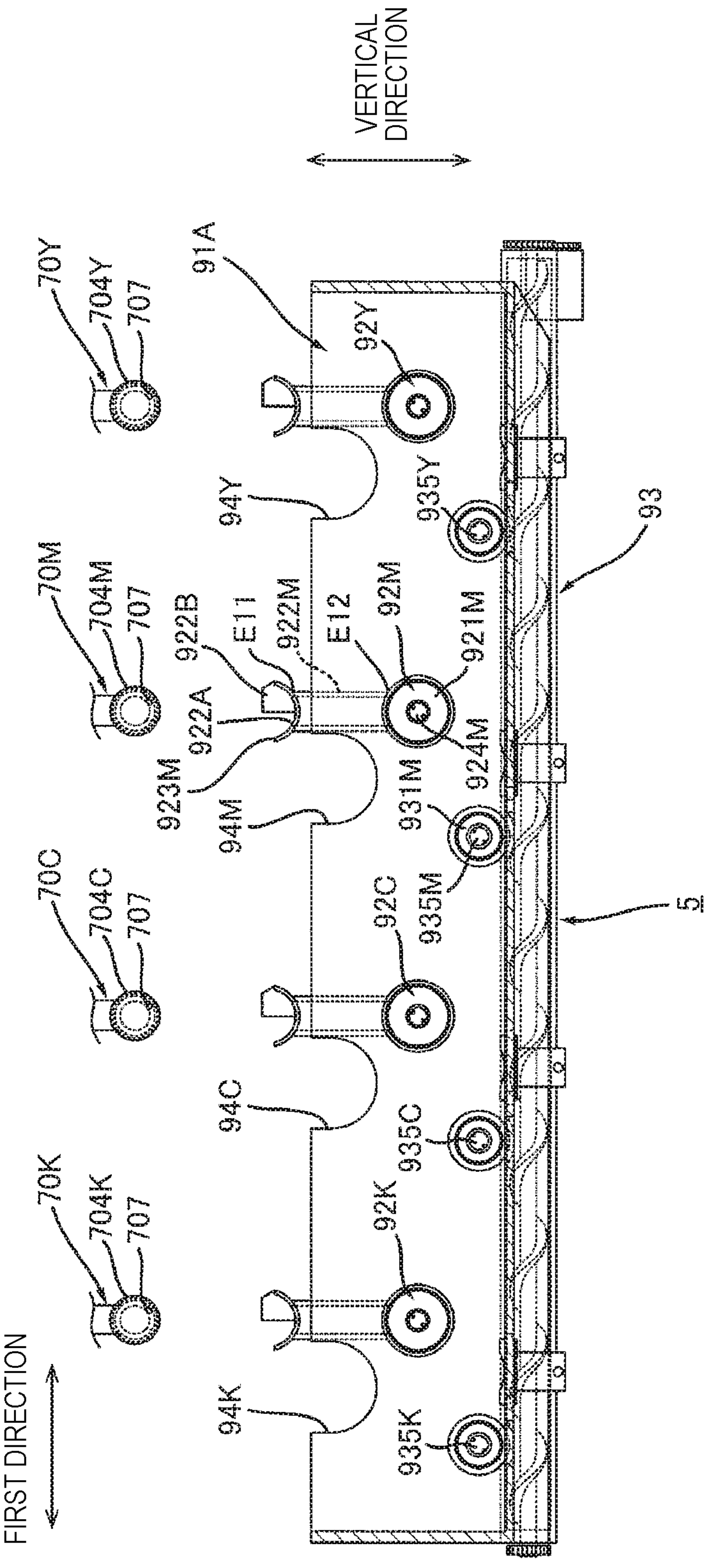
FIG. 9 is a sectional view of the drawer taken along a line B-B of FIG. 8.

As shown in FIG. 9, the second toner tube 922M extends in the vertical direction. That is, the second toner tube 922M extends in a third direction intersecting with both the first direction and the second direction. The second toner tube 922M has a square shape. The second toner tube 922M has one end E11 and the other end E12 in the vertical direction. The other end E12 is located distant from one end E11 in the vertical direction. The other end E12 is located at a position lower than one end E11. One end E11 is located at a position higher than the notch 94M. That is, one end E11 is located at a position higher than the main body coupling 61M (refer to FIG. 10) when the drawer 5 is located at the inner position. One end E11 is connected to the connection tube 70M when the drawer 5 is located at the inner position. The other end E12 is connected to the first toner tube 921M. That is, the second toner tube 922M interconnects the first toner tube 921M and the connection tube 70M when the drawer 5 is located at the inner position. An internal space of the second toner tube 922M connects with an internal space of the first toner tube 921M. The second toner tube 922M has a toner receiving opening 922A, a projection 922B, and a receiving part 922C.

The toner receiving opening 922A is located at one end E11 of the second toner tube 922M. The toner receiving opening 922A connects with the internal space of the second toner tube 922M. The toner receiving opening 922A connects with a discharge opening 706M (refer to FIG. 13) of the connection tube 70M when the drawer 5 is located at the inner position. Thereby, the toner discharged from the discharge opening 706M of the connection tube 70M is entered to the second toner tube 922M through the toner receiving opening 922A. The toner which is entered to the second toner tube 922M enters the first toner tube 921M through the second toner tube 922M.

The projection 922B is located at one end E11 of the second toner tube 922M. The projection 922B protrudes from one end E11 of the second toner tube 922M. The projection 922B extends in the vertical direction. The projection 922B has a plate shape. The projection 922B presses a projection 707 of a shutter 704M of the connection tube 70M when the drawer 5 located at the inner position is lifted by lift members 65A, 65B (refer to FIGS. 10 and 12). Thereby, the projection 922B presses the shutter 704M of the connection tube 70M from the closing position toward the opening position when the drawer 5 located at the inner position is lifted by the lift members 65A, 65B. The lift members 65A, 65B and the shutter 704M of the connection tube 70M will be described later.

The receiving part 922C is located at one end E11 of the second toner tube 922M. The receiving part 922C is configured to receive the connection part 702M of the connection tube 70M when the drawer 5 is located at the inner position. The receiving part 922C extends along a peripheral surface of the connection part 702M of the connection tube 70M. The receiving part 922C has a circular arc shape. When the drawer 5 is located at the inner position, a lower end of the receiving part 922C is located at a position higher than an upper end of the notch 94M.

4.3.3 Shutter

As shown in FIG. 8, the shutter 925M is located on a peripheral surface of the first toner tube 921M. The shutter 925M is movable in the second direction between the closing position (refer to FIG. 8) and the opening position (refer to FIG. 10). When the shutter 925M is located at the closing position, the shutter 925M closes the toner discharge opening. When the shutter 925M is located at the opening position, the toner discharge opening is opened. The shutter 925M located at the closing position comes in contact with a part of the drum cartridge 6M and moves toward the opening position when the drum cartridge 6M is attached to the drawer 5. The shutter 925M located at the opening position is pressed by a spring 926M and is thus moved toward the closing position when the drum cartridge 6M is detached from the drawer 5.

4.3.4 Auger Screw

As shown in FIG. 8, the first auger screw 923M is located inside the first toner tube 921M. The first auger screw 923M extends in a direction in which the first toner tube 921M extends. The first auger screw 923M conveys the toner in the first toner tube 921M toward the toner discharge opening.

4.3.5 First Coupling

As shown in FIG. 9, the first coupling 924M is located at one end E1 of the first toner tube 921M. The first coupling 924M is located on the outer surface of the first toner tube 921M in the second direction. The first coupling 924M is rotatable together with the first auger screw 923M. Thereby, the first coupling 924M enables to transmit the power to the first auger screw 923M. The first coupling 924M is mounted to an end portion of the first auger screw 923M in the second direction. The first coupling 924M is located below the notch 94M. That is, the first coupling 924M is located at a position lower than the main body coupling 61M (refer to FIG. 10) when the drawer 5 is located at the inner position. The first coupling 924M is connected to the first output coupling 33D (refer to FIG. 7A) of the drum cartridge 6M when the drum cartridge 6M is attached to the drawer 5. The first coupling 924M is rotatable together with the first output coupling 33D when it is connected to the first output coupling 33D.

4.4 Waste Toner Conveyor

As shown in FIG. 8, the waste toner conveyor 93 is provided at the first sidewall 91A. The waste toner conveyor 93 conveys the waste toner output from each of the four drum cartridges 6Y, 6M, 6C, 6K to the waste toner cartridge 64 (refer to FIGS. 2 and 11). The waste toner conveyor 93 includes four first waste toner tubes 931Y, 931M, 931C, 931K, a second waste toner tube 932, four shutters 933Y, 933M, 933C, 933K, four second auger screws 934Y, 934M, 934C, 934K, four second couplings 935Y, 935M, 935C, 935K (refer to FIG. 9), and an auger screw 937.

4.4.1 First Waste Toner Tube

As shown in FIG. 8, the four first waste toner tubes 931Y, 931M, 931C, 931K are aligned with intervals in the first direction. The first waste toner tube 931Y is connected to the second connection part 34 of the drum cartridge 6Y when the drum cartridge 6Y is attached to the drawer 5. The first waste toner tube 931M is connected to the second connection part 34 (refer to FIG. 6) of the drum cartridge 6M when the drum cartridge 6M is mounted to the drawer 5. The first waste toner tube 931C is connected to the second connection part 34 of the drum cartridge 6C when the drum cartridge 6C is attached to the drawer 5. The first waste toner tube 931K is connected to the second connection part 34 of the drum cartridge 6K when the drum cartridge 6K is attached to the drawer 5. The four first waste toner tubes 931Y, 931M, 931C, 931K have the same structure. Therefore, in the below, the first waste toner tube 931M is described in detail, and the descriptions of the first waste toner tubes 931Y, 931C, 931K are omitted.

The first waste toner tube 931M extends in the second direction. The first waste toner tube 931M has a cylindrical shape. The first waste toner tube 931M has a waste toner receiving opening (not shown). The waste toner receiving opening connects with an internal space of the first waste toner tube 931M. When the first waste toner tube 931M is connected to the second connection part 34 of the drum cartridge 6M, the waste toner receiving opening connects with the through-hole 34A (refer to FIG. 7A) of the second connection part 34. Thereby, the toner discharged from the drum cleaner 18M is entered to the first waste toner tube 931M through the waste toner receiving opening.

4.4.2 Second Waste Toner Tube

Figure 11:
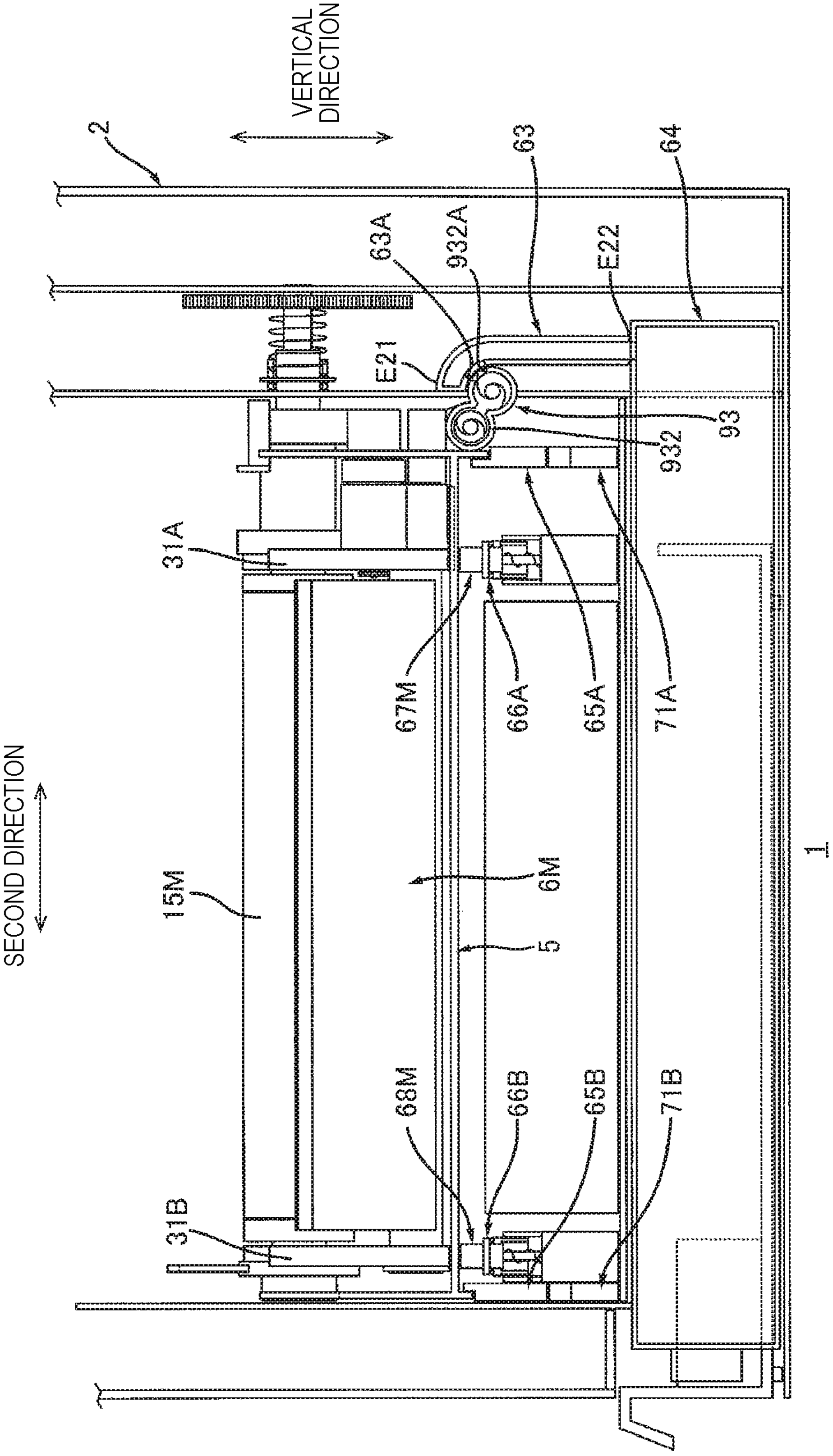
FIG. 11 is a sectional view of the image forming apparatus taken along a line C-C of FIG. 2.

The second waste toner tube 932 shown in FIG. 8 interconnects each of the four first waste toner tubes 931Y, 931M, 931C, 931K and the waste toner cartridge 64 (refer to FIG. 11). Specifically, the second waste toner tube 932 is connected to each of the four first waste toner tubes 931Y, 931M, 931C, 931K. Also, the second waste toner tube 932 is connected to the waste toner connection tube 63 (refer to FIG. 11) when the drawer 5 is located at the inner position. Thereby, the second waste toner tube 932 is connected to the waste toner cartridge 64 through the waste toner connection tube 63 when the drawer 5 is located at the inner position. The second waste toner tube 932 extends in the first direction. The second waste toner tube 932 has a cylindrical shape. The second waste toner tube 932 has a waste toner discharge opening 932A. The waste toner discharge opening 932A connects with an internal space of the second waste toner tube 932. The waste toner discharge opening 932A connects with the receiving opening 63A (refer to FIG. 11) of the waste toner connection tube 63 when the drawer 5 is located at the inner position. Thereby, when the drawer 5 is located at the inner position, the waste toner in the second waste toner tube 932 is entered to the waste toner cartridge 64 through the waste toner connection tube 63.

4.4.3 Shutter

The shutter 933M is located on a peripheral surface of the first waste toner tube 931M. The shutter 933M is movable in the second direction between the closing position (refer to FIG. 8) and the opening position (refer to FIG. 10). When the shutter 933M is located at the closing position, the shutter 933M closes the waste toner receiving opening. When the shutter 933M is located at the opening position, the waste toner receiving opening is opened. When the drum cartridge 6M is attached to the drawer 5, the shutter 933M located at the closing position comes in contact with a part of the drum cartridge 6M, thereby moving toward the opening position. When the drum cartridge 6M is detached from the drawer 5, the shutter 933M located at the opening position is pressed by a spring 936M and is thus moved toward the closing position.

In the meantime, the shutters 933Y, 933C, 933K can be described in the same manner as the shutter 933M. Therefore, the descriptions of the shutters 933Y, 933C, 933K are omitted.

4.4.4 Auger Screw

The second auger screw 934M is located inside the first waste toner tube 931M. The second auger screw 934M extends in a direction in which the first waste toner tube 931M extends. The second auger screw 934M conveys the toner in the first waste toner tube 931M toward the toner discharge opening.

In the meantime, the second auger screws 934Y, 934C, 934K can be described in the same manner as the second auger screw 934M. Therefore, the descriptions of the second auger screws 934Y, 934C, 934K are omitted.

4.4.5 Second Coupling

As shown in FIG. 9, the second coupling 935M is located at one end of the first waste toner tube 931M in the second direction. The second coupling 935M is located on an outer surface of the first waste toner tube 931M in the second direction. The second coupling 935M is rotatable together with the second auger screw 934M. Thereby, the second coupling 935M transmits the power to the second auger screw 934M. The second coupling 935M is mounted to an end portion of the second auger screw 934M in the second direction. The second coupling 935M is connected to the second output coupling 34D (refer to FIG. 7A) of the drum cartridge 6M when the drum cartridge 6M is attached to the drawer 5. The second coupling 935M is rotatable together with the second output coupling 34D when it is connected to the second output coupling 34D.

In the meantime, the second couplings 935Y, 935C, 935K can be described in the same manner as the second coupling 935M. Therefore, the descriptions of the second couplings 935Y, 935C, 935K are omitted.

4.4.6 Auger Screw

The auger screw 937 is located inside the second waste toner tube 932. The auger screw 937 extends in a direction in which the second waste toner tube 932 extends. The auger screw 937 conveys the waste toner in the second waste toner tube 932 toward the waste toner discharge opening 932A.

5. Details of Image Forming Apparatus

Subsequently, the image forming apparatus 1 is described in detail with reference to FIGS. 10 to 16.

As shown in FIG. 10 or 11, the image forming apparatus 1 includes a main body coupling 61M, a connection tube 70M, a shutter 704M, a waste toner cartridge 64, a waste toner connection tube 63, two lift members 65A, 65B, two rails 71A, 71B, pressing members 67M, 68M, and two cams 66A, 66B.

In the meantime, the image forming apparatus 1 further includes main body couplings 61Y, 61C, 61K (not shown), connection tubes 70Y, 70C, 70K (refer to FIG. 2), and pressing members 67Y, 67C, 67K, 68Y, 68C, 68K (refer to FIG. 8).

5.1 Main Body Coupling

As shown in FIG. 10, the main body coupling 61M is located inside the main body housing 2. The main body coupling 61M is movable in the second direction between a main body coupling connecting position (refer to FIG. 10) and a main body coupling disconnecting position (refer to FIG. 12).

When the drum cartridge 6M is attached to the drawer 5 and the drawer 5 is located at the inner position, when the main body coupling 61M is located at the main body coupling connecting position, the main body coupling 61M is connected to the drum coupling 32 (refer to FIG. 7A) of the drum cartridge 6M. Thereby, the main body coupling 61M transmits the power from the image forming apparatus 1 to the drum cartridge 6M when the drum cartridge 6M is attached to the drawer 5 and the drawer 5 is located at the inner position.

Figure 12:
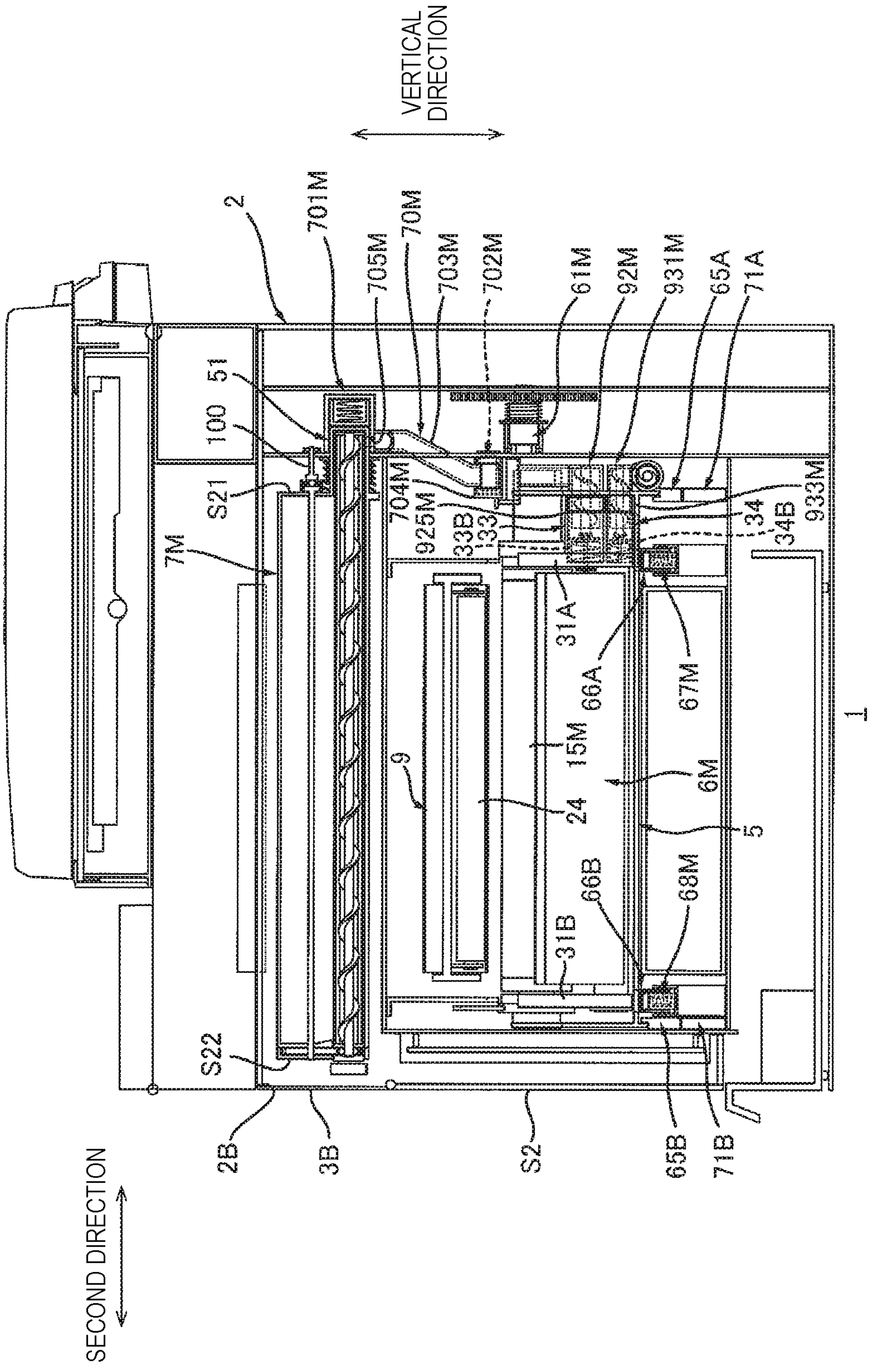
FIG. 12 depicts a state where a cover of the image forming apparatus shown in FIG. 10 is located at the opening position.

On the other hand, as shown in FIG. 12, when the drum cartridge 6M is attached to the drawer 5 and the drawer 5 is located at the inner position, when the main body coupling 61M is located at the main body coupling disconnecting position, the main body coupling 61M is separated from the drum coupling 32 of the drum cartridge 6M. Thereby, the transmission of the power from the image forming apparatus 1 to the drum cartridge 6M is released.

In the meantime, the main body couplings 61Y, 61C, 61K (not shown) have the same structure as the main body coupling 61M, respectively. Therefore, the descriptions of the main body couplings 61Y, 61C, 61K are omitted.

5.2 Connection Tube

As shown in FIG. 2, the four connection tubes 70Y, 70M, 70C, 70K are aligned side by side in the first direction. The connection tube 70Y is connected to the toner cartridge 7Y and the toner conveyor 92Y (refer to FIG. 9). The connection tube 70M is connected to the toner cartridge 7M and the toner conveyor 92M (refer to FIG. 9). The connection tube 70C is connected to the toner cartridge 7C and the toner conveyor 92C (refer to FIG. 9). The connection tube 70K is connected to the toner cartridge 7K and the toner conveyor 92K (refer to FIG. 9).

Specifically, as shown in FIG. 10, the connection tube 70M has a receiving tube 701M, a connection part 702M, and a pipe 703M. In the meantime, the connection tubes 70Y, 70C, 70K have the same structure as the connection tube 70M, respectively. Therefore, in the below, the descriptions of the connection tubes 70Y, 70C, 70K are omitted.

The receiving tube 701M is located inside the main body housing 2. The receiving tube 701M extends in the second direction. The receiving tube 701M has a cylindrical shape. The receiving tube 701M receives the protrusion 51 of the toner cartridge 7M when the toner cartridge 7M is attached to the image forming apparatus 1. The receiving tube 701M has a through-hole 705M. The through-hole 705M connects with the toner discharge opening 51A (refer to FIG. 5B) of the toner cartridge 7M when the toner cartridge 7M is attached to the image forming apparatus 1.

Figure 13:
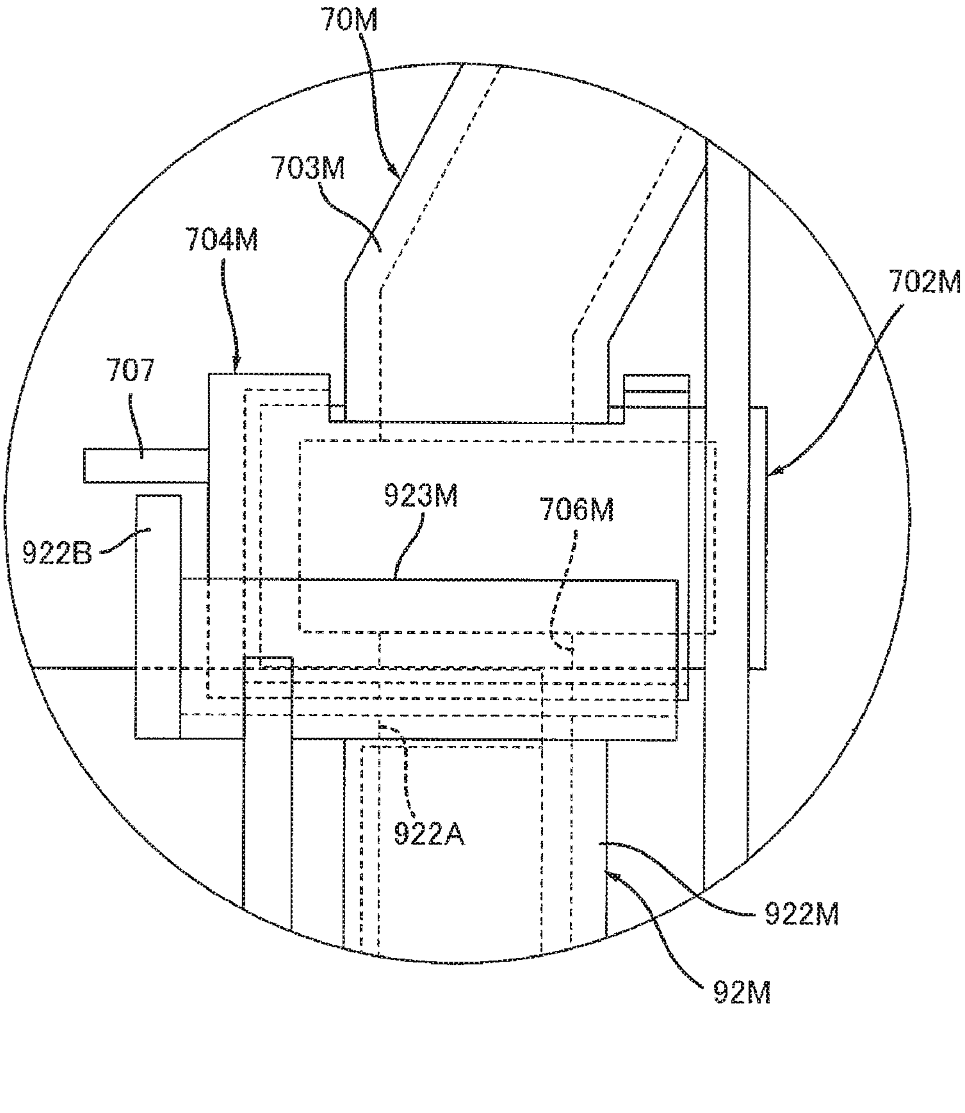
FIG. 13 is a partially enlarged view of the image forming apparatus shown in FIG. 10.

The connection part 702M is located below the receiving tube 701M in the main body housing 2. As shown in FIG. 13, the connection part 702M extends in the second direction. The connection part 702M has a cylindrical shape. The connection part 702M has a discharge opening 706M. That is, the connection tube 70M has the discharge opening 706M. The discharge opening 706M connects with an internal space of the connection part 702M. Thereby, the toner in the connection part 702M is discharged through the discharge opening 706M.

As shown in FIG. 10, the pipe 703M interconnects the receiving tube 701M and the connection part 702M. One end of the pipe 703M is connected to the receiving tube 701M. The other end of the pipe 703M is connected to the connection part 702M. An internal space of the pipe 703M connects with the through-hole 705M and the internal space of the connection part 702M. Thereby, the toner in the toner cartridge 7M is entered to the second toner tube 922M of the toner conveyor 92M through the pipe 703M and the connection part 702M.

5.3 Shutter

Figure 14:
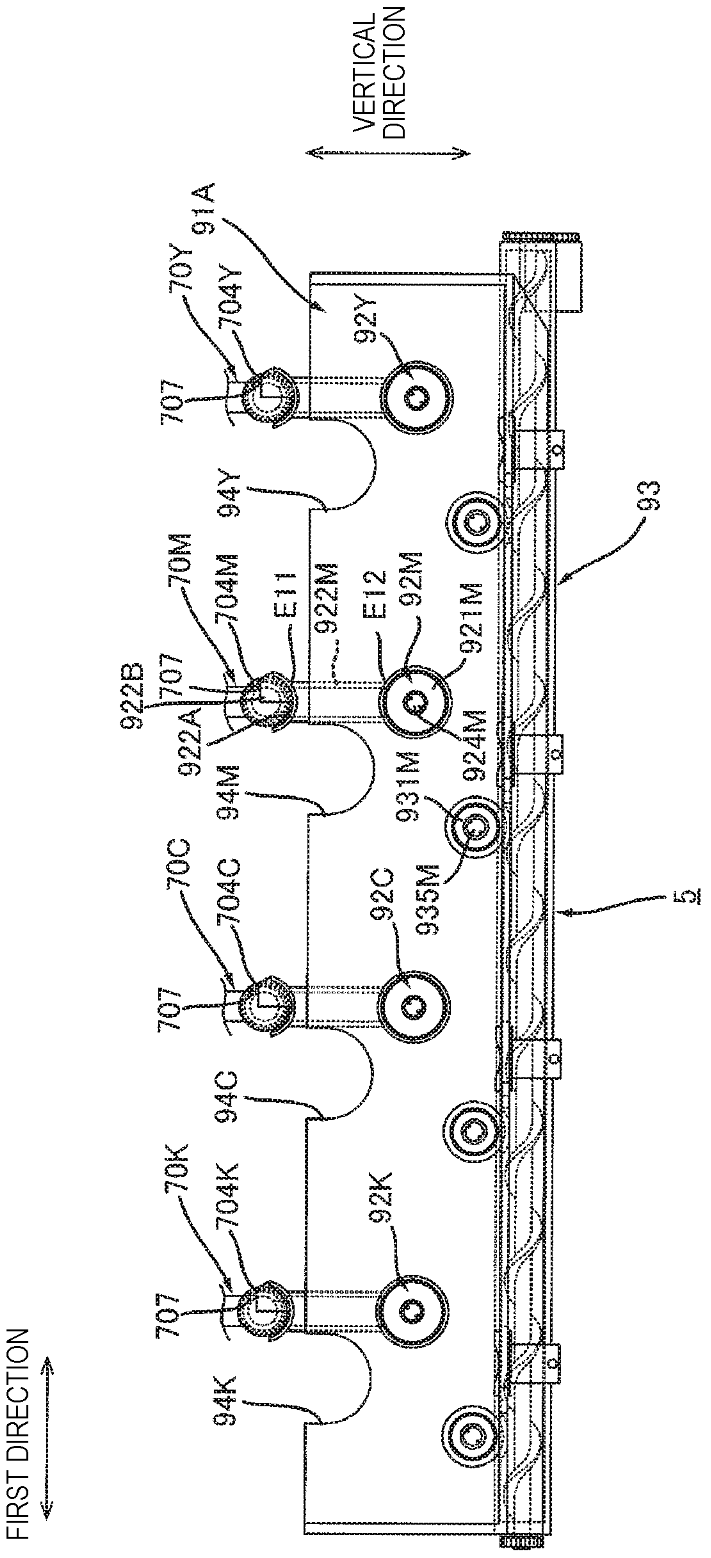
FIG. 14 illustrates connection of a toner conveyor and a connection tube.

As shown in FIG. 9, the shutter 704M is located on the peripheral surface of the connection part 702M. The shutter 704M is movable between the closing position (refer to FIG. 9) and the opening position (refer to FIG. 14) along the peripheral surface of the connection part 702M. When the shutter 704M is located at the closing position, the shutter 704M closes the discharge opening 706M. When the shutter 704M is located at the opening position, the discharge opening 706M is opened. The shutter 704M has a projection 707. When the lift members 65A, 65B (refer to FIGS. 10 and 12) lift the drawer 5, the projection 922B of the toner conveyor 92M presses the projection 707, as shown in FIGS. 9 and 14. Thereby, the shutter 704M is moved from the closing position to the opening position. That is, when the lift members 65A, 65B lift the drawer 5, the shutter 704M comes in contact with the projection 707, which is a part of the drawer 5, thereby moving from the closing position to the opening position. On the other hand, when the lift members 65A, 65B lower the drawer 5, the shutter 704M separates from the projection 707 and moves from the opening position to the closing position.

5.4 Waste Toner Cartridge

Figure 15:
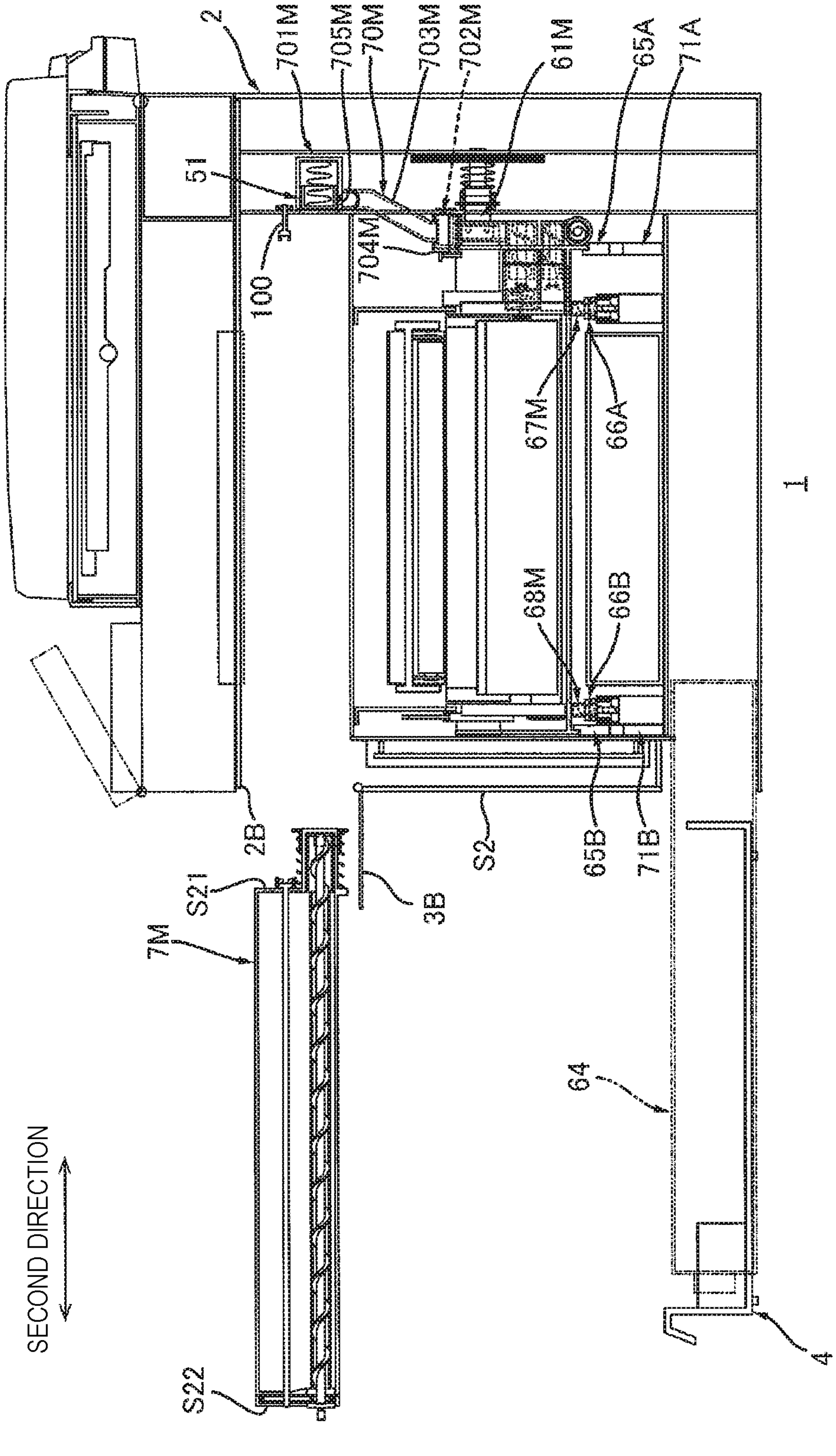
FIG. 15 depicts a state where a waste toner cartridge and a toner cartridge are detached from the image forming apparatus.

As shown in FIG. 11, the waste toner cartridge 64 has a box shape extending in the second direction. The waste toner cartridge 64 is connected to the waste toner connection tube 63 when the waste toner cartridge 64 is attached to the image forming apparatus 1. When the waste toner cartridge 64 is attached to the image forming apparatus 1, the waste toner cartridge 64 accommodates the waste toner removed from the peripheral surface of the photosensitive drum 15Y by the drum cleaner 18Y, the waste toner removed from the peripheral surface of the photosensitive drum 15M by the drum cleaner 18M, the waste toner removed from the peripheral surface of the photosensitive drum 15C by the drum cleaner 18C and the waste toner removed from the peripheral surface of the photosensitive drum 15K by the drum cleaner 18K. The waste toner cartridge 64 can be detached in the second direction from the main body housing 2 when the feeder cassette 4 is detached from the image forming apparatus 1, as shown in FIG. 15.

5.5 Waste Toner Connection Tube

As shown in FIG. 11, the waste toner connection tube 63 is located inside the main body housing 2. The waste toner connection tube 63 extends in the vertical direction. The waste toner connection tube 63 has one end E21 and the other end E22 in the vertical direction. One end E21 is located at a position higher than the waste toner discharge opening 932A of the waste toner conveyor 93 when the drawer 5 is located at the inner position. The other end E22 is connected to the waste toner cartridge 64 when the waste toner cartridge 64 is attached to the main body housing 2. The waste toner connection tube 63 has a receiving opening 63A. The receiving opening 63A is located at one end E21 of the waste toner connection tube 63. The receiving opening 63A connects with the waste toner discharge opening 932A of the waste toner conveyor 93 when the drawer 5 located at the inner position is lifted by the lift members 65A, 65B.

5.6 Lift Member

Figure 16:
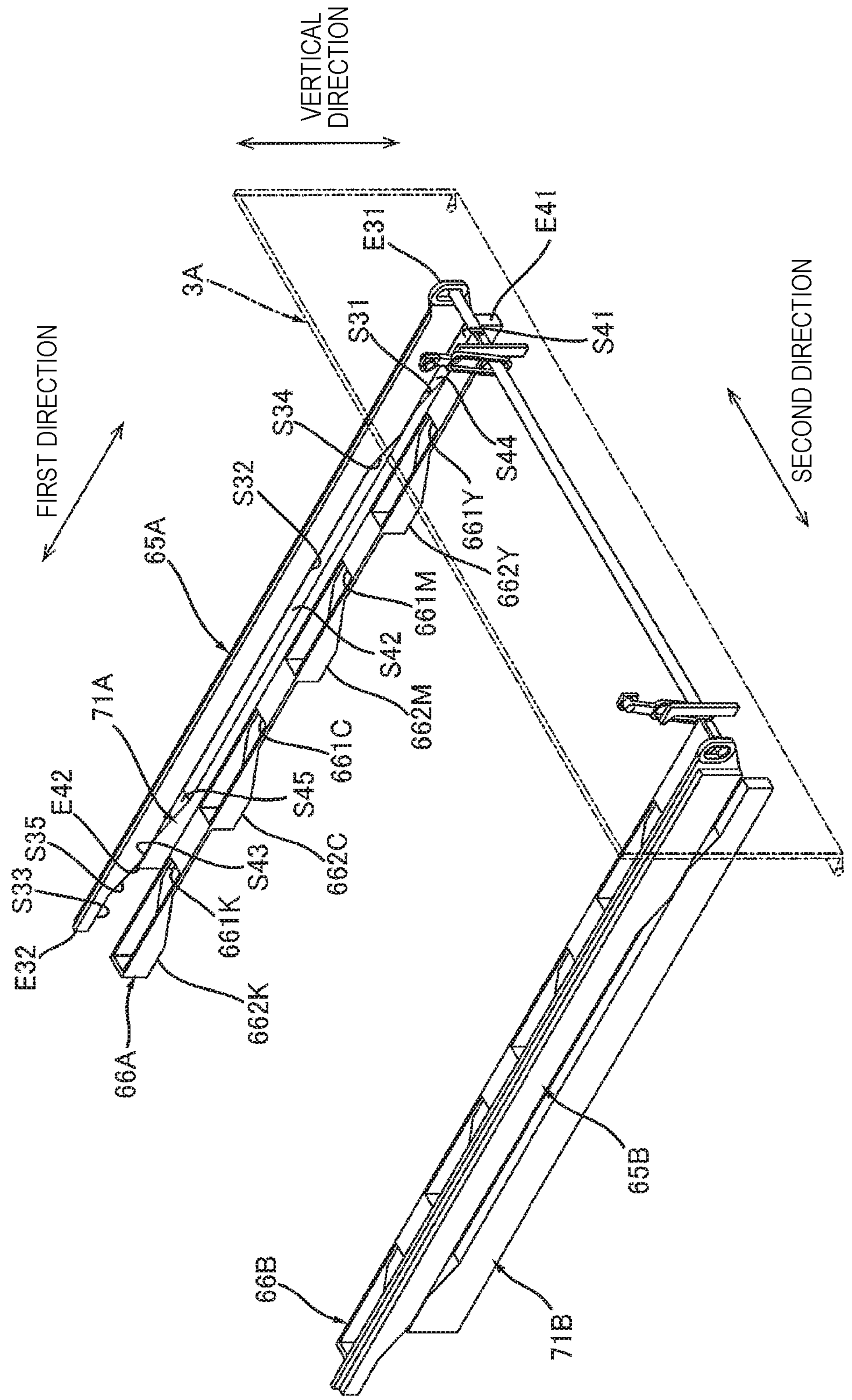
FIG. 16 is a perspective view of a lift member, a rail and a cam shown in FIG. 10.

As shown in FIGS. 10 and 16, the two lift members 65A, 65B are located with an interval in the second direction. The lift member 65A supports the first sidewall 91A (refer to FIG. 8) of the drawer 5. The lift member 65B supports the second sidewall 91B (refer to FIG. 8) of the drawer 5. The two lift members 65A, 65B are respectively coupled to the cover 3A. Thereby, the two lift members 65A, 65B function in conjunction with the cover 3A. Each of the lift members 65A, 65B is movable in the vertical direction between a first lift position (refer to FIG. 10) and a second lift position (refer to FIG. 12) lower than the first lift position. The lift member 65A and the lift member 65B have the same structure. Therefore, in the below, the lift member 65A is described in detail, and the description of the lift member 65B is omitted.

As shown in FIG. 16, the lift member 65A extends in the first direction. The lift member 65A has one end E31 and the other end E32 in the first direction. One end E31 is coupled to the cover 3A. The other end E32 is located distant from one end E31 in the first direction. A lower surface of the lift member 65A has a first planar surface S31, a second planar surface S32, a third planar surface S33, a first inclined surface S34, and a second inclined surface S35.

The first planar surface S31 is located at one end E31 of the lift member 65A. The first planar surface S31 extends in the first direction.

The second planar surface S32 is located between the first planar surface S31 and the third planar surface S33 in the first direction. The second planar surface S32 is located at a position higher than the first planar surface S31. The second planar surface S32 extends in the first direction.

The third planar surface S33 is located at the other end E32 of the lift member 65A. The third planar surface S33 is located at a position higher than the second planar surface S32. The third planar surface S33 extends in the first direction.

The first inclined surface S34 is located between the first planar surface S31 and the second planar surface S32 in the first direction. The first inclined surface S34 is formed to interconnect the first planar surface S31 and the second planar surface S32. The first inclined surface S34 is inclined relative to the first direction. The first inclined surface S34 faces upward from the first planar surface S31 toward the second planar surface S32.

The second inclined surface S35 is located between the second planar surface S32 and the third planar surface S33 in the first direction. The second inclined surface S35 is formed to interconnect the second planar surface S32 and the third planar surface S33. The second inclined surface S35 is inclined relative to the first direction. The second inclined surface S35 faces upward from the second planar surface S32 toward the third planar surface S33.

5.7 Rail

As shown in FIGS. 10 and 16, the two rails 71A, 71B are located with an interval in the second direction. The rail 71A supports the lift member 65A. The rail 71B supports the lift member 65B. The rails 71A, 71B are respectively fixed in the main body housing 2. The rail 71A and the rail 71B have the same structure. Therefore, in the below, the rail 71A is described in detail, and the description of the rail 71B is omitted.

As shown in FIG. 16, the rail 71A extends in the first direction. The rail 71A has one end E41 and the other end E42 in the first direction. The other end E42 is located distant from one end E41 in the first direction. One end E41 is located between the other end E42 and the cover 3A in the first direction. An upper surface of the rail 71A has a first planar surface S41, a second planar surface S42, a third planar surface S43, a first inclined surface S44, and a second inclined surface S45.

The first planar surface S41 is located at one end E41 of the rail 71A. The first planar surface S41 extends in the first direction.

The second planar surface S42 is located between the first planar surface S41 and the third planar surface S43 in the first direction. The second planar surface S42 is located at a position higher than the first planar surface S41. The second planar surface S42 extends in the first direction.

The third planar surface S43 is located at the other end E42 of the rail 71A. The third planar surface S43 is located at a position higher than the second planar surface S42. The third planar surface S43 extends in the first direction.

The first inclined surface S44 is located between the first planar surface S41 and the second planar surface S42 in the first direction. The first inclined surface S44 is formed to interconnect the first planar surface S41 and the second planar surface S42. The first inclined surface S44 is inclined relative to the first direction. The first inclined surface S44 faces upward from the first planar surface S41 toward the second planar surface S42.

The second inclined surface S45 is located between the second planar surface S42 and the third planar surface S43 in the first direction. The second inclined surface S45 is formed to interconnect the second planar surface S42 and the third planar surface S43. The second inclined surface S45 is inclined relative to the first direction. The second inclined surface S45 faces upward from the second planar surface S42 toward the third planar surface S43.

When the cover 3A is located at the closing position, the first planar surface S31 of the lift member 65A comes in contact with the second planar surface S42 of the rail 71A and the second planar surface S32 of the lift member 65A comes in contact with the third planar surface S43 of the rail 71A. Thereby, the lift member 65A is located at the first lift position. In the meantime, when the lift member 65A is located at the first lift position, the second planar surface S32 of the lift member 65A and the second planar surface S42 of the rail 71A separate from each other in the vertical direction.

Also, when the lift member 65A is located at the first lift position, the toner conveyor 92Y and the connection tube 70Y are interconnected, the toner conveyor 92M and the connection tube 70M are interconnected, the toner conveyor 92C and the connection tube 70C are interconnected and the toner conveyor 92K and the connection tube 70K are interconnected, as shown in FIG. 14.

In the meantime, as shown in FIG. 16, when the cover 3A is located at the opening position, the first planar surface S31 of the lift member 65A is in contact with the first planar surface S41 of the rail 71A, the second planar surface S32 of the lift member 65A is in contact with the second planar surface S42 of the rail 71A, and the third planar surface S33 of the lift member 65A is in contact with the third planar surface S43 of the rail 71A. Thereby, the lift member 65A is located at the second lift position.

When the lift member 65A is located at the second lift position, the toner conveyor 92Y separates from the connection tube 70Y, the toner conveyor 92M separates from the connection tube 70M, the toner conveyor 92C separates from the connection tube 70C, and the toner conveyor 92K separates from the connection tube 70K, as shown in FIG. 9.

When the cover 3A is moved from the closing position toward the opening position, the lift members 65A, 65B are pulled by the cover 3A and are thus moved from the first lift position toward the second lift position.

Also, when the cover 3A is moved from the opening position toward the closing position, the lift members 65A, 65B are pressed by the cover 3A and are thus moved from the second lift position toward the first lift position. Thereby, the lift members 65A, 65B lift the drawer 5 located at the inner position. That is, when the cover 3A is moved from the opening position toward the closing position, the lift members 65A, 65B lift the drawer 5 located at the inner position in conjunction with the movement of the cover 3A.

5.8 Pressing Member

As shown in FIG. 10, the pressing member 67M and the pressing member 68M press the drum cartridge 6M upward when the drum cartridge 6M is attached to the drawer 5, the drawer 5 is located at the inner position and the cover 3A is located at the closing position. Thereby, the photosensitive drum 15M comes in contact with the intermediate transfer belt 24.

Specifically, as shown in FIGS. 10 and 12, the pressing member 67M is movable vertically between a first pressing position (refer to FIG. 10) and a first pressing-release position (refer to FIG. 12). When the pressing member 67M is located at the first pressing position, the pressing member 67M is in contact with the drum side plate 31A of the drum cartridge 6M through the opening 901M. When the pressing member 67M is moved from the first pressing-release position toward the first pressing position, the pressing member 67M presses upward the drum side plate 31A of the drum cartridge 6M. On the other hand, when the pressing member 67M is located at the first pressing-release position, the pressing member 67M comes out from the opening 901M and is thus separated from the drum side plate 31A of the drum cartridge 6M. Thereby, the pressing of the pressing member 67M to the drum cartridge 6M is released.

The pressing member 68M is located distant from the pressing member 67M in the second direction. The pressing member 68M is movable vertically between a second pressing position (refer to FIG. 10) and a second pressing-release position (refer to FIG. 12). When the pressing member 68M is located at the second pressing position, the pressing member 68M is in contact with the drum side plate 31B of the drum cartridge 6M through the opening 902M. When the pressing member 68M is moved from the second pressing-release position toward the second pressing position, the pressing member 68M presses upward the drum side plate 31B of the drum cartridge 6M. The pressing member 67M presses the drum side plate 31A and the pressing member 68M presses the drum side plate 31B, so that the drum cartridge 6M is pushed up. Thereby, the photosensitive drum 15M comes in contact with the intermediate transfer belt 24. On the other hand, when the pressing member 68M is located at the second pressing-release position, the pressing member 68M comes out from the opening 902M and is thus separated from the drum side plate 31B of the drum cartridge 6M. Thereby, the pressing of the pressing member 68M to the drum cartridge 6M is released. The pressing member 67M is separated from the drum side plate 31A and the pressing member 68M is separated from the drum side plate 31B, so that the drum cartridge 6M is moved down by its own weight and is supported by the drawer 5. Thereby, the photosensitive drum 15M is separated from the intermediate transfer belt 24.

In the meantime, the pressing members 67Y, 67C, 67K (refer to FIG. 8) have the same structure as the pressing member 67M, respectively, and the pressing members 68Y, 68C, 68K (refer to FIG. 8) have the same structure as the pressing member 68M, respectively. Therefore, the descriptions of the pressing members 67Y, 67C, 67K, 68Y, 68C, 68K are omitted.

5.9 Cam

As shown in FIG. 10, the two cams 66A, 66B are located below the drawer 5 when the drawer 5 is located at the inner position. The two cams 66A, 66B are respectively coupled to the cover 3A, as shown in FIG. 16. Thereby, the two cams 66A, 66B enable to move in the first direction in conjunction with the movement of the cover 3A.

The cam 66A extends in the first direction. The cam 66A has four through-holes 661Y, 661M, 661C, 661K and four pressing parts 662Y, 662M, 662C, 662K.

The four through-holes 661Y, 661M, 661C, 661K are aligned side by side in the first direction. The four through-hole 661Y, 661M, 661C, 661K extend in the first direction, respectively. The pressing member 67Y (refer to FIG. 8) passes through the through-hole 661Y. The pressing member 67M (refer to FIG. 8) passes through the through-hole 661M. The pressing member 67C (refer to FIG. 8) passes through the through-hole 661C. The pressing member 67K (refer to FIG. 8) passes through the through-hole 661K.

The pressing part 662Y is located around the through-hole 661Y. The pressing part 662M is located around the through-hole 661M. The pressing part 662C is located around the through-hole 661C. The pressing part 662K is located around the through-hole 661K.

As shown in FIGS. 10 and 12, when the cover 3A is moved from the closing position toward the opening position, the pressing part 662M comes in contact with the pressing member 67M. The pressing part 662M presses the pressing member 67M from the first pressing position toward the first pressing-release position. The pressing member 67M is pressed by the pressing part 662M and is thus moved from the first pressing position toward the first pressing-release position. Thereby, when the cover 3A is moved from the closing position toward the opening position, the pressing member 67M is moved from the first pressing position toward the first pressing-release position in conjunction with the movement of the cover 3A.

In the meantime, the pressing parts 662Y, 662C, 662K have the same structure as the pressing part 662M, respectively, and operate in the same manner as the pressing part 662M. That is, when the cover 3A is moved from the closing position toward the opening position, the pressing part 662Y presses the pressing member 67Y from the first pressing position toward the first pressing-release position. When the cover 3A is moved from the closing position toward the opening position, the pressing part 662C presses the pressing member 67C from the first pressing position toward the first pressing-release position. When the cover 3A is moved from the closing position toward the opening position, the pressing part 662K presses the pressing member 67K from the first pressing position toward the first pressing-release position. That is, when the cover 3A is moved from the closing position toward the opening position, the cam 66A presses each of the four pressing members 67K, 67M, 67C, 67K from the first pressing position toward the first pressing-release position.

As shown in FIG. 16, the cam 66B is located distant from the cam 66A in the second direction. The cam 66B has the same structure as the cam 66A. When the cover 3A is moved from the closing position toward the opening position, the cam 66B presses each of the four pressing members 68K, 68M, 68C, 68K from the second pressing position toward the second pressing-release position.

6. Operational Effects (1) As shown in FIG. 8, in the image forming apparatus 1, the drawer 5 is provided with the toner conveyor 92M capable of conveying the toner which is to be supplied from the toner cartridge 7M to the drum cartridge 6M.

For this reason, as compared to a configuration where the toner conveyor 92M is provided in the main body housing 2 and is directly connected to the drum cartridge 6M of the drawer 5, it is possible to simplify a structure of the part provided to the main body housing 2 within a toner conveying path from the toner cartridge 7M to the developing device 17M.

Thereby, it is possible to suppress the structure in the main body housing 2 from being complicated.

2) Also, as shown in FIG. 7A, the drum cartridge 6M includes the first output coupling 33D, and as shown in FIG. 9, the toner conveyor 92M includes the first coupling 924M. When the drum cartridge 6M is attached to the drawer 5, the first output coupling 33D is connected to the first coupling 924M. Thereby, the first output coupling 33D transmits the power to the toner conveyor 92M.

For this reason, it is possible to operate the toner conveyor 92M by using the power input from the image forming apparatus 1 to the drum cartridge 6M.

As a result, it is not necessary to provide a configuration for transmitting the power to the toner conveyor 92M in the main body housing 2, so that it is possible to suppress the structure in the main body housing 2 from being complicated.

(3) Also, as shown in FIG. 8, the drawer 5 includes the waste toner conveyor 93, in addition to the toner conveyor 92M. As shown in FIG. 7A, the drum cartridge 6M includes the second output coupling 34D, and as shown in FIG. 9, the waste toner conveyor 93 includes the second coupling 935M. When the drum cartridge 6M is attached to the drawer 5, the second output coupling 34D is connected to the second coupling 935M. Thereby, the second output coupling 34D transmits the power to the second auger screw 934M of the waste toner conveyor 93.

For this reason, it is possible to operate the waste toner conveyor 93 by using the power input from the image forming apparatus 1 to the drum cartridge 6M.

As a result, it is not necessary to provide a configuration for transmitting the power to the waste toner conveyor 93 in the main body housing 2, so that it is possible to suppress the structure in the main body housing 2 from being complicated.

7. Modified Embodiments

Subsequently, a modified embodiment is described with reference to FIGS. 17 to 19.

Figure 17:
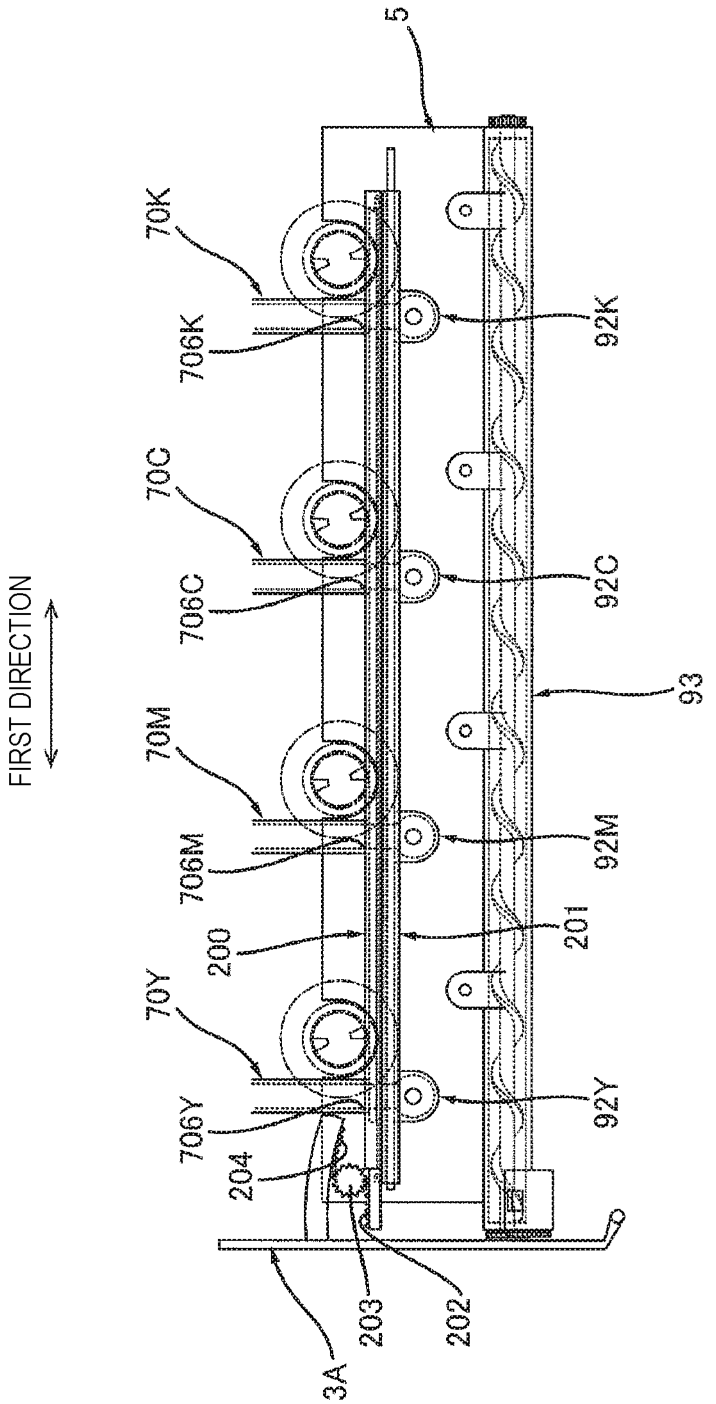
FIG. 17 illustrates a modified embodiment, depicting a state where the cover is located at the closing position and a shutter is located at the opening position.

As shown in FIG. 17, the image forming apparatus 1 may include a shutter 200. Also, the drawer 5 may include a shutter 201.

Figure 18:
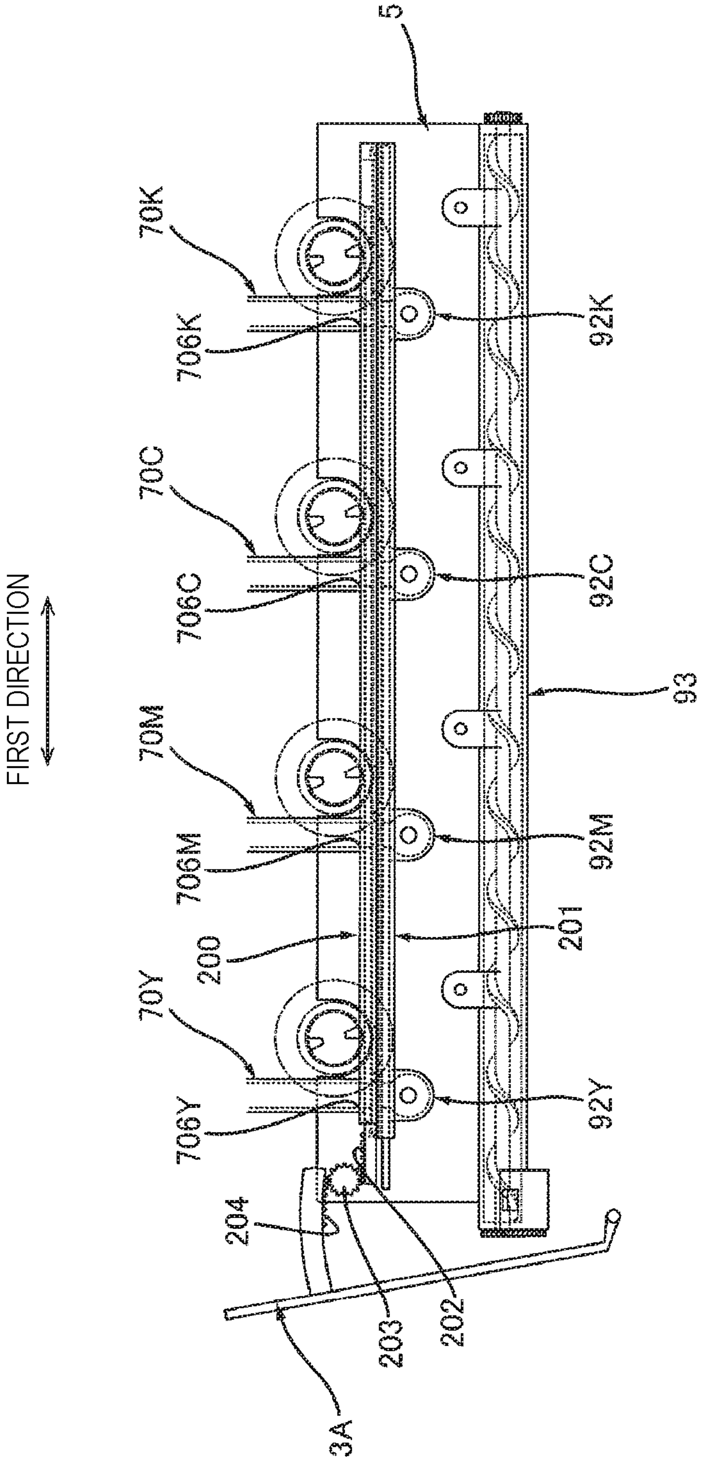
FIG. 18 illustrates the modified embodiment, together with FIG. 17, depicting a state where the cover is being moved from the closing position to the opening position and the shutter is located at the closing position.

As shown in FIGS. 17 and 18, the shutter 200 is movable between the closing position (refer to FIG. 17) and the opening position (refer to FIG. 18) in conjunction with the movement of the cover 3A.

Specifically, the shutter 200 extends in the first direction. The shutter 200 is mounted to a lower end portion of the connection tube 70Y, a lower end portion of the connection tube 70M, a lower end portion of the connection tube 70C, and a lower end portion of the connection tube 70K. The shutter 200 is movable in the first direction. The shutter 200 has a rack gear 202. The rack gear 202 is located at an end portion of the shutter 200 in the first direction. The rack gear 202 extends in the first direction. The image forming apparatus 1 includes a pinion gear 203. The pinion gear 203 is in mesh with the rack gear 202 when the cover 3A is located at the closing position and the shutter 200 is located at the opening position. The cover 3A has a rack gear 204. The rack gear 204 is in mesh with the pinion gear 203 when the cover 3A is located at the closing position.

When the shutter 200 is located at the closing position, the shutter 200 closes the four discharge openings 706Y, 706M, 706C, 706K.

When the cover 3A is moved from the opening position toward the closing position, the pinion gear 203 is rotated by the rack gear 204, so that the shutter 200 is moved from the closing position toward the opening position.

When the shutter 200 is located at the opening position, the four discharge openings 706Y, 706M, 706C, 706K are opened.

Also, the shutter 201 is movable between the closing position (refer to FIG. 17) and the opening position (refer to FIG. 18), together with the shutter 200.

Specifically, the shutter 201 extends in the first direction. The shutter 201 is mounted to the toner conveyor 92Y, the toner conveyor 92M, the toner conveyor 92C and the toner conveyor 92K. The shutter 201 has a projection 201A (refer to FIG. 19) that is to be fitted in a hole 200A (refer to FIG. 19) of the shutter 200. The projection 201A is fitted in the hole 200A, so that the shutter 201 is movable together with the shutter 200.

Figure 19:
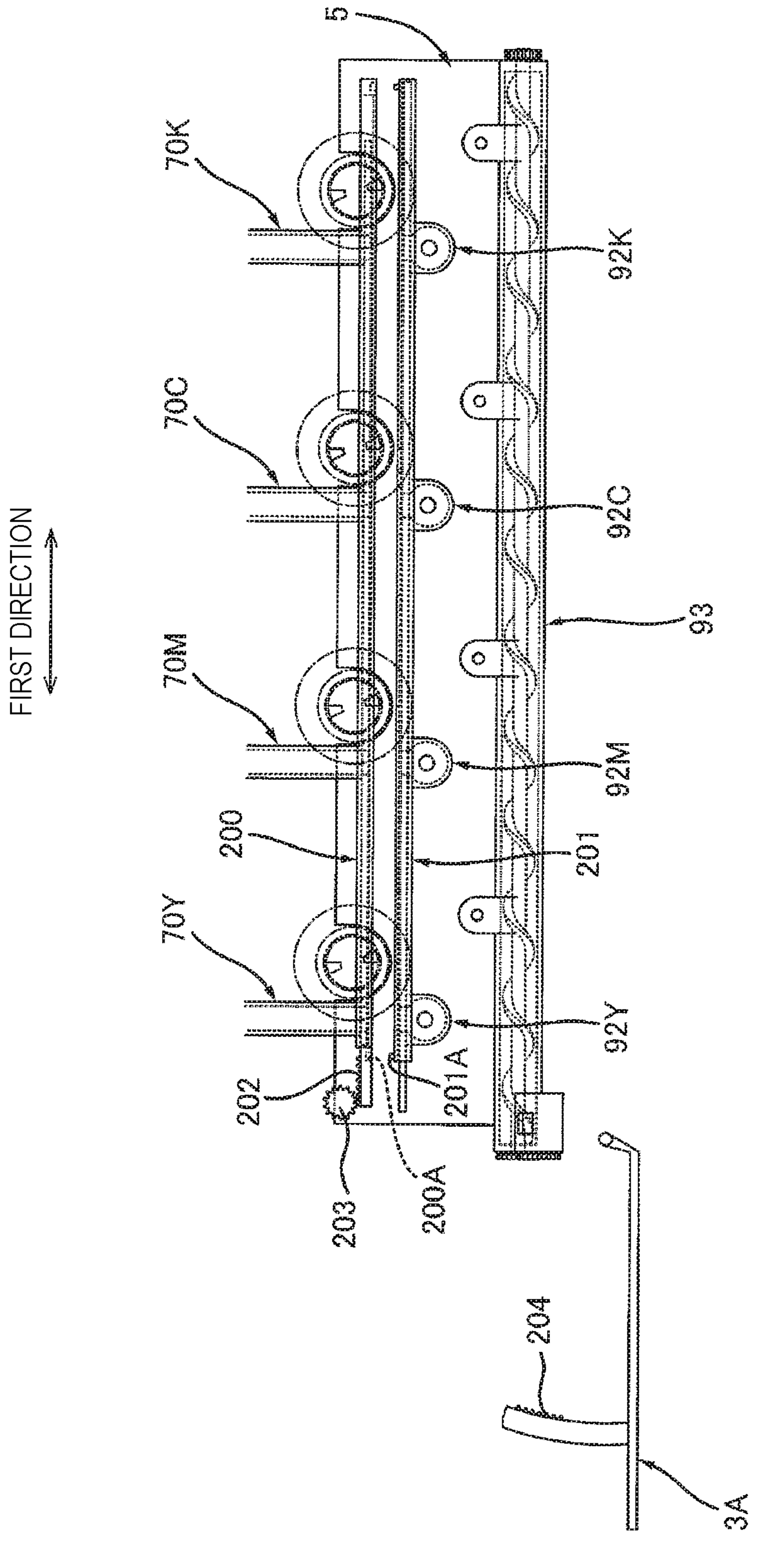
FIG. 19 illustrates the modified embodiment, together with FIGS. 17 and 18, depicting a state where the cover is located at the opening position.

As shown in FIGS. 18 and 19, after the shutter 200 is located at the closing position and the shutter 201 is located at the closing position, the cover 3A is located at the opening position, so that the drawer 5 is moved downward when the drawer 5 is supported by the lift members 65A, 65B, like the above exemplary embodiment. At this time, the shutter 201 is separated from the shutter 200.

Even with the modified embodiment, it is possible to accomplish the same operational effects as the exemplary embodiment.

What is claimed is:

1. An image forming apparatus comprising:

a main body housing comprising:

a first wall arranged at a side of a first direction of the main body housing, the first wall having a first opening;

a second wall arranged at a side of a second direction of the main body housing, the second wall having a second opening, the second direction being perpendicular to the first direction;

a first door at the first opening; and a second door at the second opening;

a drawer configured to support a drum cartridge comprising a photosensitive drum; and a toner cartridge storing toner;

wherein, in a case where the first door is opened, the drawer is movable between an inner position where the drawer is located inside the main body housing and an outer position where the drawer is located outside the main body housing, and wherein, in a case where the second door is opened, the toner cartridge is detachable from and is attachable to the main body housing through the second opening in the second direction.

2. The image forming apparatus according to claim 1, wherein the drum cartridge further comprises a developing device comprising a developing roller.

3. The image forming apparatus according to claim 1, wherein the drum cartridge rotatably supports the photosensitive drum, and wherein, in a case where the drum cartridge is attached to the drawer, the photosensitive drum is rotatable around an axis extending in the second direction.

4. The image forming apparatus according to claim 1, wherein the drum cartridge further comprises a developing device comprising a developing roller, and wherein the drum cartridge supports the developing device such that the developing roller is movable relative to the photosensitive drum.

5. The image forming apparatus according to claim 1, further comprising:

a drum cleaner configured to collect waste toner from the photosensitive drum; and a waste toner cartridge configured to store the waste toner collected by the drum cleaner, wherein the waste toner cartridge is attachable to and detachable from the main body housing in the second direction.

6. The image forming apparatus according to claim 5, further comprising:

a waste toner connection tube being connected to the waste toner cartridge in a case where the waste toner cartridge is attached to the main body casing.

7. The image forming apparatus according to claim 1, further comprising:

a connection tube configured to convey toner from the toner cartridge to the drawer.

8. The image forming apparatus according to claim 7, wherein the drawer comprises a toner conveyor configured to pass the toner from the connection tube to the drum cartridge.

9. The image forming apparatus according to claim 1, further comprising:

a feeder cassette configured to store a sheet;

wherein the feeder cassette is detachable from and is attachable to the main body housing in the second direction.

* * * * *